United States Patent
Dozortsev et al.

(10) Patent No.: US 11,530,143 B2
(45) Date of Patent: Dec. 20, 2022

(54) TREATMENT OF AQUEOUS MATRICES USING ELECTROLYSIS TO PRODUCE SOLUBLE TIN METAL

(71) Applicant: AMS Trace Metals, Inc., Sunnyvale, CA (US)

(72) Inventors: Vladimir Dozortsev, Ridgewood, NJ (US); Richard Bacon, Fremont, CA (US); Jose Antonio Moreno, Los Banos, CA (US)

(73) Assignee: AMS Trace Metals, Inc., Wilmington, DE (US)

( * ) Notice: Subject to any disclaimer, the term of this patent is extended or adjusted under 35 U.S.C. 154(b) by 198 days.

(21) Appl. No.: 16/622,529

(22) PCT Filed: Jul. 5, 2018

(86) PCT No.: PCT/US2018/040836
§ 371 (c)(1),
(2) Date: Dec. 13, 2019

(87) PCT Pub. No.: WO2019/014034
PCT Pub. Date: Jan. 17, 2019

(65) Prior Publication Data
US 2020/0207645 A1    Jul. 2, 2020

Related U.S. Application Data

(60) Provisional application No. 62/530,262, filed on Jul. 9, 2017.

(51) Int. Cl.
*C02F 1/46* (2006.01)
*C02F 1/467* (2006.01)
(Continued)

(52) U.S. Cl.
CPC .. *C02F 1/4678* (2013.01); *C02F 2001/46119* (2013.01); *C02F 2001/46133* (2013.01);
(Continued)

(58) Field of Classification Search
CPC .. C25C 1/14; C02F 1/46; C02F 1/4678; C02F 2001/46133; C02F 2101/22;
(Continued)

(56) References Cited

U.S. PATENT DOCUMENTS

| 2007/0108056 A1* | 5/2007 | Nyberg | C02F 1/469 204/554 |
| 2008/0017523 A1* | 1/2008 | Dietze | G01N 27/38 204/402 |
| 2017/0008775 A1* | 1/2017 | Finke | C02F 1/008 |

FOREIGN PATENT DOCUMENTS

JP    54110147    * 8/1979 ............ Y02P 10/234

* cited by examiner

*Primary Examiner* — Zulmariam Mendez
(74) *Attorney, Agent, or Firm* — Marc P. Schuyler

(57) ABSTRACT

This disclosure provides techniques for treatment of aqueous matrices using electrolysis to produce soluble metals. An aqueous matrix of interest is passed through an electrolysis device with at least one consumable electrode, which dissolves under applied current, transferring a desired reagent to the aqueous matrix of interest. In one embodiment, the electrolysis device is used in a water delivery network to passivate hexavalent chromium (Cr6) and/or convert it to trivalent chromium; the electrode can be made of food-grade metal tin, which is electrolyzed to form a stannous reagent, which then reacts with the Cr6. The disclosed techniques provide for Cr6 passivation without requiring the use of concentrated acids or other harmful substances. Long term reagent generation efficiency can be enhanced through the use of cleaning processes which maintain a fresh electrode surface in contact with the aqueous matrix of interest.

25 Claims, 14 Drawing Sheets

(51) Int. Cl.
*C02F 1/461* (2006.01)
*C02F 101/22* (2006.01)

(52) U.S. Cl.
CPC .. *C02F 2101/22* (2013.01); *C02F 2201/4614* (2013.01); *C02F 2201/46145* (2013.01); *C02F 2209/05* (2013.01); *C02F 2209/06* (2013.01)

(58) Field of Classification Search
CPC .... C02F 2201/4614; C02F 2201/46145; C02F 2209/05; C02F 2209/06; C02F 2001/46119
See application file for complete search history.

TREATMENT OF AQUEOUS MATRICES USING ELECTROLYSIS TO PRODUCE SOLUBLE TIN METAL

FIELD AND REFERENCE TO RELATED CASES

This disclosure claims the benefit of U.S. Provisional Patent Application No. 62/530,262, filed on behalf of first-named inventor Vladimir Dozortsev on Jul. 9, 2017, for "Treatment of aqueous matrices using electrolysis to produce soluble metals;" this provisional application is hereby incorporated by reference. This disclosure also incorporates by reference Patent Cooperation Treaty (PCT) Application No. PCT/US2017038022 for TECHNIQUES FOR TOXIC METAL DETECTION AND SPECIATION IN AQUEOUS MATRICIES (published as WO/2018013293 and also published as US Patent Publication (USPB) 2020003745A1, on Jan. 2, 2020, as the national stage entry of this PCT Application, U.S. Ser. No. 16/309,009) and PCT Application No. PCT/IB2016/000776 for RENEWABLE MERCURY MENISCUS ELECTRODE WITH MERCURY CIRCULATION SYSTEM AND CONTAMINANT REMOVAL (published as USPB 20180136161 on May 17, 2018 as the national stage entry of this latter PCT Application).

This disclosure relates to methods, devices and systems for reducing toxic metal presence in liquids; more specifically, the present disclosure provides techniques for reducing toxic metal presence in water using techniques that electrolyze food-grade tin. Techniques are optionally specific to the removal of chromium-6 ("Cr6"), selenium (Se), and/or mercury (Hg). It is specifically contemplated that the techniques presented by this disclosure can be extended to reduction of other undesired materials, to aqueous matrices other than water, and to electrolysis of metals other than tin. For example, it is also specifically contemplated that the techniques presented herein can be applied to reduce corrosive agents present in a plumbing system, whether or not toxic materials are involved.

BACKGROUND

Hexavalent chromium, or "chromium 6" ($CrO_4^{2-}$, or "Cr6"), refers to a specific state of chromium that is naturally presented by chromium ore and in connection with a wide variety of products and manufacturing processes. For example, Cr6 can be used in paints and dyes, and is produced naturally as a result of metalworking. Because Cr6 is naturally occurring, it can be present in water supplies, especially ground water such as well water, river water, lake water and aqueduct water. The same can be true for other toxic materials, including without limitation, certain forms of selenium, mercury and other materials.

Many of these materials are generally thought of, however, as very hazardous to human health, and have been correlated with cancer and other severe health problems by a number of studies. For this reason, governmental regulatory entities have established maximum levels of such materials that are allowed to be present in potable and/or recycled water; for example, the State of California has set of maximum contaminant level of ten parts-per-billion (i.e., 10.0 ppb) for Cr6, and the presence of this substance is also regulated by the US Occupational Safety and Health Administration (OSHA) and the European Union.

There exists at least one known treatment method for reducing these materials in water; these methods typically involve a chemical process where an inorganic acid (e.g., generally sulfuric or hydrochloric acid, in which a stannous ion has been dissolved) is added to water in carefully-controlled amounts, in order to reduce the presence of unwanted material (such as Cr6). However, this process typically requires the use of very strong concentrations of acid in order to dissolve solid metal tin; such acids are generally also hazardous to human health. These acids are also relatively expensive, have special requirements for safe storage, handling and transport, and require very high levels of training and monitoring for proper and safe usage. Because of these limitations, generally speaking, such methods are not practical for use in either commercial water distribution systems or for small scale private use (e.g., especially for remote residential use or small-scale water distribution which must rely heavily on ground water supply).

What are needed are improved techniques for the reduction of hazardous materials in water, especially, and without limitation, Cr6, selenium, mercury and/or other toxic metals. Still further, what are needed are techniques that can be safely and readily applied to remote water treatment, such in regions not having large water distribution networks and which may have to rely more heavily on local water treatment. As this statement implies, techniques are needed that can ideally be practically implemented for small scale private use (e.g., for private residences, apartment or commercial buildings, and very localized distribution of ground water, especially potable water, such as from aqueducts, rivers, lakes or wells). However, ideally, such techniques would also be applicable to large scale water distribution, e.g., so as to provide potential cost, technology and safety improvements for large-scale water treatment. Such techniques ideally would not require the use of hazardous reagents, such as strong acids. The present invention is directed to these needs and provides further, related advantages.

Figure 1A:
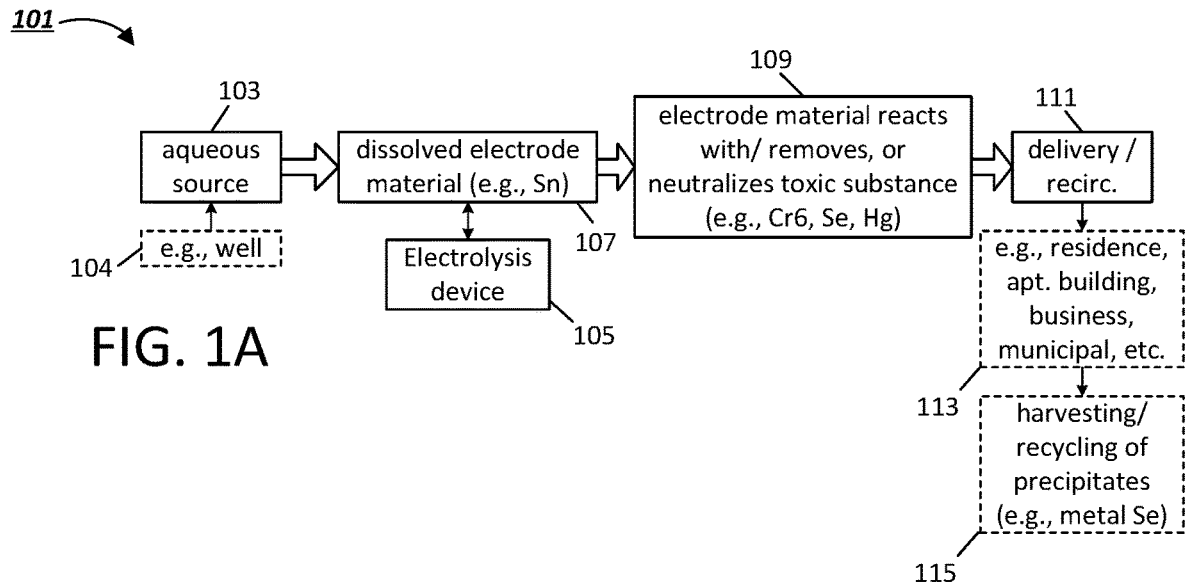
FIG. 1A is a block diagram of one embodiment showing techniques for treating water using electrolysis.

The subject matter defined by the enumerated claims may be better understood by referring to the following detailed description, which should be read in conjunction with the accompanying drawings (and appendix). This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to reduce toxic metal presence in water, especially including one or more of Cr6, mercury, selenium and/or other toxic metals using electrolysis. The disclosed techniques provide for methodologies that do not require the use of dangerous or expensive acids, and provide for an in situ, near real-time, system that can safely and inexpensively convert dangerous metals to a substance that is safe and/or can be easily removed from water. In yet another application, the disclosed techniques can be used to neutralize (disable) or/and inhibit corrosive agents present in water (bacteria, biofilm, etc.), or/and passivate corrosion sites by covering them with tin compounds generated into water; for some embodiments, the disclosed techniques therefore can also greatly extend the expected lifetime of plumbing systems, i.e., by inhibiting corrosion. Without being bound by theory, it is believed that stannous ion production destroys certain biofilms that can corrode plumbing and thereby both damage the plumbing as well as release harmful metals (e.g., copper, lead, etc.) into liquid in that plumbing—the disclosed techniques can be applied to destroy biofilms and agents such as peroxides, chlorine, permanganate, oxygen, and a wide variety of other substances (i.e., whether or not a toxic metal is involved). The disclosed techniques can also be applied to liquids other than water; as an example of this, the techniques disclosed herein in theory can be applied to a recirculatory system, e.g., based on coolant or another liquid, with electrolysis and/or passivation used to extend the useful life of such a cooling system, once again, by inhibiting corrosion. Applications contemplated by this disclosure include removal of toxic metals and metalloids from contaminated water sources and industrial wastewaters such as power plant, refineries, mining and other effluents. Specific examples include individual or combined dissolved mercury and selenite removal from flue gas desulfurization (FGD) wastewater or coal ash pons dewatering using the electrolysis techniques described herein. Other applications of the disclosed techniques will no doubt also occur to those having ordinary skill in the art. The various techniques can be embodied as software, in the form of a computer, network or other device running such software, as well as in the form of other apparatuses, systems, components, devices and/or methods. While specific examples are presented, the principles described herein may also be applied to other apparatuses, systems, components, devices and/or methods as well.

DETAILED DESCRIPTION

Several of the embodiments presented in this disclosure provide for apparatuses, systems, components, devices and/or methods for reducing toxic metal presence or corrosive material presence in a liquid. Advantageously, techniques disclosed hereby use electrolysis of a relatively safe, inexpensive material, to transfer a substance into the liquid of interest (e.g., water) which naturally reacts with one or more target substances to render them inert, or otherwise to enable their straightforward removal. In one example implementation, the material used is food-grade metal tin; tin is a relatively inexpensive material that is generally not regulated in food/drinking water applications and is generally considered not harmful to human health in low quantities. Through the use of a solid, inexpensive material that can be easily and safely handled, and that can be readily and safely used in a process (e.g., a low voltage process) by layman or water management personnel, such an embodiment provides for an easily-scaled mechanism that can be used to reduce toxic metal presence, particularly chromium-6 (Cr6), selenium and/or mercury, in a wide variety of applications.

In this latter regard, note that Cr6 is often found as a natural ore, and therefore as a material that is frequently present in ground water, such as well water, lake water, aqueduct water and river water. The same can be said for other toxic materials such as certain forms of selenium and mercury. The disclosed techniques provide for a solution that can be implemented where and as desired, on a private or commercial basis, in both large- and small-scale applications; for example, systems disclosed herein can be readily-implemented on a relatively large-scale basis (e.g., by a municipal water supply which distributes millions of gallons of potable water a month) or on a relatively-small scale basis (e.g., at a business, apartment building, or single-family dwelling) which for example might use a less than 100-1000 gallons of water (or less) daily. In one embodiment, the consumable used in such embodiments—solid, food grade tin—can be sold in the form of a modular replacement unit that is easily obtained and replaced once worn out. Specific embodiments discussed below provide electrode and materials embodiments which are especially useful to both large-scale and small-scale applications. Note that a beneficial by-product of the techniques discussed herein is the production of relatively low levels of hydrogen gas, which generally inherently and immediately react with corrosive substances or evaporates, such as peroxide, chlorine, manganese, oxygen, biofilms and a wide variety of other corrosive substances; used at the entrance point of a dwelling or building, for example, or in a recirculatory system (e.g., cooling system), the disclosed techniques can thereby provide a mechanism for reducing corrosion and extending expected lifetime of a plumbing system.

The techniques contemplated by this disclosure can also be implemented in large scale treatment systems, for example, for potable or waste water treatment. Conventional techniques for removing Cr6, mercury and selenium are generally expensive, time consuming and require variety of toxic or dangerous substances (e.g., very concentrated acids, bases, coagulants etc.) that create transport, storage, handling and waste disposal issues. Additionally, use of multiple reagents my impact further wastewater treatment steps. Dissolved Cr6, mercury and/or selenium removal by electrolytically generated stannous ion is fast, effective and does not require extensive chemicals use. Online electrolytically generated stannous regent rapidly converts dissolved these elements easily processed forms, for example, into elemental form in the case of mercury or selenium (or to other forms such as stannous selenide or Cr3). For example, in an application to mercury, stannic reagent treatment is effective to convert $Hg^{2+}$ to elemental mercury ($Hg^0$), the latter of which is insoluble in water can be easily purged by bubbling air (e.g., oxygen and/or nitrogen) through the water and venting exhaust gas through a filter (e.g., a charcoal filter). In addition or instead, soluble selenite (e.g., $Se^{4+}$) can be can be rapidly converted by stannous reagent into insoluble forms (e.g., $Se^0$), which readily precipitates and can be diverted from treated water as a separable sediment or sludge and processed further for recycling (harvesting or refining) of metal selenium. Another advantage of electrolytically generated stannous ion (e.g., as a reagent for chromium, mercury and/or selenite removal from industrial wastewaters) is that the stannous material can be precipitated shortly after the remediation process, and does not interfere with further wastewater treatment steps (biological, physical chemical, etc.). This approach is relatively simple, economical and environmentally friendly, because stannous ion is a safe nontoxic reagent. Optionally, the entire remediation process can be automated by using online metal analyzers.

Other advantages and applications will be apparent from the description below.

Prior to proceeding to a more detailed discussion, however, it would be helpful to first introduce certain terms used herein.

Specifically contemplated implementations can include "hardware logic," "circuits" or "circuitry" (each meaning one or more electronic circuits). Generally speaking, these terms can include analog and/or digital circuitry, and can be special purpose in nature or general purpose. For example, as used herein, the term "circuitry" for performing a particular function can include one or more electronic circuits that are either "hard-wired" (or "dedicated") to performing the stated function, and the term can instead include a microcontroller, microprocessor, FPGA or other form of circuit processor which is general in design but which runs software code (e.g., instructional logic) that causes or configures the circuit processor (e.g., configures or directs the circuit processor) to perform the stated function. Note that as this definition implies, "circuits" and "circuitry" for one purpose are not necessarily mutually-exclusive to "circuits" or "circuitry" for another purpose, e.g., such terms indicate that one or more circuits are configured to perform a function, and one, two, or even all circuits can be shared with "circuitry" to perform another function (indeed, such is often the case where the "circuitry" includes a processor). "Logic" can include hardware logic, instructional logic, or both. Instructional logic can be code written or designed in a manner that has certain structure (architectural features) such that, when the code is ultimately executed, the code causes the one or more general purpose machines (e.g., a processor, computer or other machine) each to behave as a special purpose machine, having structure that necessarily performs described tasks on input operands in dependence on the code to take specific actions or otherwise produce specific outputs. Throughout this disclosure, various processes will be described, any of which can generally be implemented as instructional logic (e.g., as instructions stored on non-transitory machine-readable media or other software logic), as hardware logic, or as a combination of these things, depending on embodiment or specific design. "Non-transitory" machine-readable or processor-accessible "media" or "storage" as used herein means any tangible (i.e., physical) storage medium, irrespective of the technology used to store data on that medium, e.g., including without limitation, random access memory, hard disk memory, optical memory, a floppy disk, a CD, a solid state drive (SSD), server storage, volatile memory, non-volatile memory, and other tangible mechanisms where instructions may subsequently be retrieved by a machine. The media or storage can be in standalone form (e.g., a program disk or solid state device) or embodied as part of a larger mechanism, for example, resident memory that is part of a laptop computer, portable device, server, network, printer, or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or different processors, processor cores, FPGAs or other configurable circuits, depending on embodiment. Throughout this disclosure, various processes will be described, any of which can generally be implemented as instructions stored on non-transitory machine-readable media, and any of which can be used to reduce toxic metal presence and/or remove corrosive agents from a liquid as contemplated by this disclosure. Also depending on implementation, the instructions can be executed by a single computer and, in other cases, can be stored and/or executed on a distributed basis, e.g., using one or more servers, web clients, or application-specific devices. Each function mentioned in reference to the various FIGS. herein can be implemented as part of a combined program or as a standalone module, either stored together on a single media expression (e.g., single floppy disk) or on multiple, separate storage devices. "Module" as used herein refers to a structure dedicated to a specific function; for example, a "first module" to perform a first specific function and a "second module" to perform a second specific function, when used in the context of instructions (e.g., computer code) refer to mutually-exclusive code sets. When used in the context of mechanical or electromechanical structures (e.g., an "encryption module," the term "module" refers to a dedicated set of components which might include hardware and/or software). In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder or "means" for "any structure whatsoever" (e.g., "a team of oxen") for performing a recited function.

In the various embodiments presented below, an application to the treatment of potable water will be described, primarily citing Cr6 as an example of the target substance that is to be removed. In all cases, it should be understood that Cr6 removal is optional, and that the presented techniques/embodiments can instead or in addition contemplate the removal of selenium and/or mercury as the target substance, or any combination of these substances or other toxic or unwanted substances, or to applications of corrosion mitigation (e.g., where there is no specific toxic metal that is to be removed from the aqueous matrix of interest).

As noted earlier, there do exist conventional techniques for removing toxic materials (especially toxic metals) from an aqueous source, but these are generally expensive and require dangerous substances (e.g., very concentrated sulfuric or hydrochloric acid) that create transport, storage, handling and waste disposal issues. Larger water distribution networks (e.g., such as large cities' water companies) might have resources to manage acid-based treatment processes and, even if toxic metal reduction is needed, these large networks can sometimes have so many controls and processes for water treatment that the aqueous matrix in question (i.e., the water or other liquid needing treatment) can be assumed to neutral (that is, have a pH of between 7-8, have consistent conductivity levels, and be relatively free of organics and other undesired substances). For smaller water networks however, such in rural communities and small towns which rely on local ground water, the assumption of consistent water parameters and the ability to manage the mentioned acid-based processes can be much more problematic. It is therefore desired to have systems which can be easily implemented in large and small water distribution networks, even for a small community or an individual building if desired.

FIG. 1A is a block diagram showing a first embodiment of techniques 101 for addressing these goals. More particularly, it is assumed that there is an aqueous source 103 produces an aqueous matrix (i.e., a liquid) that is to be treated using the techniques described herein. The source in question can be well water 104, as illustrated by a dashed-line (i.e., optional) box. To reduce presence of a particular target substance assumed to be in the liquid in question, an electrolysis device 105 is used to dissolve a material 107 that will react with or otherwise render the target substance neutral and/or insoluble, as indicated by function block 109. As implied by this function block, in one optional embodiment, the material that is to be dissolved can be metal tin (Sn); also, in one optional embodiment, the material is provided in the form one or more electrodes of the electrolysis device 105 such that, as charge is supplied to the electrolysis device 105, the electrode material slowly dissolves into the liquid and reacts with/removes the target substance; as noted by function block 109, in one embodiment, the target substance can optionally be Cr6, and in other embodiments, it can optionally be Se, Hg, or any forms or combinations of these materials. With each target substance being removed from the liquid in question, or at least reduced in concentration to regulated and/or safe levels, the liquid in question can then be distributed, delivered or recirculated, as indicated by numeral 111; in one optional embodiment, referenced by numeral 113 for example, this delivery can provide potable water to a residence, apartment building, business, municipality or, for that matter, any other entity. Generally speaking, the dissolved material (e.g., metal tin) is a consumable that lasts for a period of time until completely or mostly dissolved; when this substance degrades to the point where it is no longer effective, the consumable is safely replaced by an operator (or end user), optionally on a modular basis. For example, in several embodiments, this consumable can be supplied, used and disposed of in a manner that does not require distribution, storage or other usage of harmful acids, or for that matter, special handling processes that might be applicable to regulated, harmful or toxic materials. Finally, as noted by optional process block 115, in one embodiment, the target substance of interest once removed from the aqueous matrix of interest can be extracted and refined; for example, an embodiment will be described below in connection with FIGS. 13A-C where selenium-based precipitates are separated from water and are purified by acid treatment, for harvesting and recycling of metal selenium.

It is noted that the techniques described above are optionally applied to water treatment, and to the removal of harmful metals using electrolyzed metal tin. These techniques however can optionally also be extended to other target substances using electrolysis of other materials. For example, in other embodiments, the target substance that is to be removed can be another toxic material, including, by way of non-limiting example, toxic metals such as selenium, mercury, cadmium, lead, copper, arsenic, chromium, beryllium, aluminum, nickel, uranium, zinc, and to other metals and non-metallic substances, or corrosive agents such as peroxide, chlorine, manganese, oxygen, biofilms and other corrosive materials; the electrolyzed material can be a metal or other material that will be effective to render these target substances insoluble or otherwise react with these target substances to convert them to a relatively safe and/or more easily treated form.

Figure 1B:
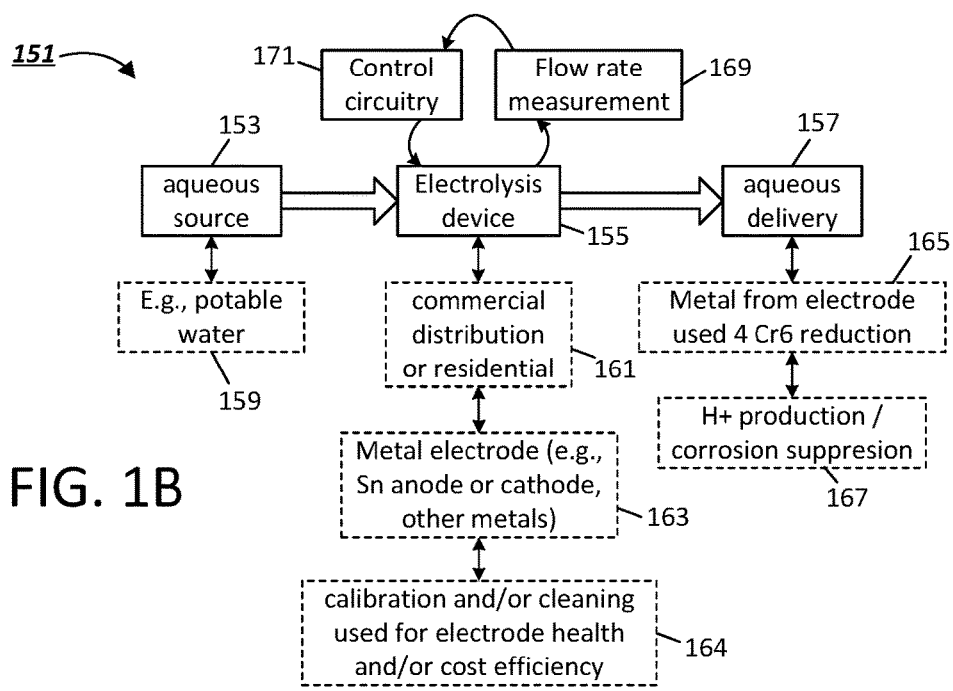
FIG. 1B is another block diagram showing techniques for treating water using electrolysis.

FIG. 1B shows another embodiment, generally designated by numeral 151. An aqueous source 153 produces a liquid, e.g., water; for example, the source can be a well, an aqueduct, a river, a lake, a feed from a street to a private home, a main water line for a building, and so forth—it is any supply of a liquid. In a typical embodiment, the liquid is water that will be used by, handled by, or come into close proximity handled by humans or animals, e.g., potable water 159, or water that will be used for landscaping, manufacturing or other purposes. As noted earlier, Cr6 is a naturally occurring substance often present in earth and rock formations; the same is true for selenides and metal mercury. These materials can therefore be naturally present in aqueous matrices, such as water supplies, and it can also potentially be released into water supplies at elevated levels as the result of human activities, such as farming, construction or mining. It is therefore desired to regulate the concentration of these materials (e.g., Cr6, Se and/or Hg) such that they do not exceed reasonably safe levels, especially for potable water. While this substance can be present in any water supply, it is most likely to be present at high levels in water with a high mineral content, such as well water, or water drawn from rivers, lakes or aqueducts, or waste water produced from human activities, as mentioned. Many factors can influence the concentration of these materials in water, including without limitation, seasonal variations, activities such as mining, construction and farming, weather, temperature and other factors, and the concentrations can change over time, even over a matter of hours; these illustrative factors and associated impact on a water supply are non-limiting.

As indicated by numeral 105, an electrolysis device receives the water and uses an electrolysis process to transfer solid material (e.g., food-grade metal tin in this example) to the liquid being processed. For example, incoming water is passed through the electrolysis device 155 such that the water immerses a first electrode (e.g., an anode having metal tin) as well as a second electrode; optionally, the second electrode is also reciprocally made of the same material, or it can be made of stainless steel or another potable water compatible conductor, such as carbon). In one contemplated, optional embodiment, the anode is made of food-grade tin, and the cathode is made out of stainless steel; in another optional embodiment, both of these electrodes are made to have (and to release in operation) food grade tin. A low-voltage current is passed between these two electrodes, and the associated voltage and/or current and/or current density are controlled so that tin from the electrode very slowly dissolves in the water and forms a reagent of interest, "tin-2" (i.e., a stannous ion such as $HSnO_2^-$, which is a relatively safe, water soluble substance); at the same time, excess hydrogen gas is also formed at one of the electrodes (e.g., an anode), as indicated by numeral 167. This hydrogen gas and/or the tin-2 reacts with various corrosive materials which are naturally present in low quantities in the water, and reduces or eliminates the presence of these corrosive materials or otherwise negates their effect, with excess hydrogen gas otherwise evaporating from the water. The stannous material produced by the electrolysis ($HSnO_2^-$) readily reacts (165) with other target substances (e.g., Cr6) present in the water; in the case of Cr6, this produces a reaction by-product of tin-4 ($Sn(OH)_6$)) and trivalent chromium ($CrO_3$ or "Cr3"—this material, Cr3, is generally considered non-harmful and a beneficial mineral). In one optional embodiment, the production of tin-2 can be regulated using circuitry 169 to perform flow rate measurement as well as circuitry 171 to automatically control voltage and/or current, so as to regulate the transfer of tin to the aqueous matrix in question. For example, it was earlier mentioned that in one embodiment, the tin-2 can be formed from a metal tin consumable that is periodically replaced; optionally, to avoid wasting the consumable when flow rates are low, in one embodiment, the voltage and/or current and/or current density is regulated (i.e., throttled to regulate the rate of reagent generation, in a manner dependent on measured flow). For example, if it be assumed that an electrolysis device is used in-line between a private residence and a well, when the residence is not using any water, and the water flow rate is zero, the electrolysis device can be turned completely off to save power and avoid wasting tin when it is not needed. As this statement implies, in certain optional implementations, it can be assumed that Cr6 presence is at worst-case levels, and tin-2 production can be regulated solely in dependence on water flow rate. In other embodiments, particularly for higher-capacity implementations (e.g., a municipal water network), it can be desired to use much more sophisticated control based on measured water parameters; for example, as will be discussed further below, a voltametric system can be used as part of a comprehensive management system, e.g., with tin-2 production also being regulated dependent on dynamically-measured Cr6 presence—the more Cr-6 is currently present (or predicted), the more tin-2 is added to the aqueous matrix being treated, while the less Cr6 the less tin-2 is added, for any given flow rate. Other optional control and enhancement processes will be further described below.

In a typical implementation, and again assuming that Cr6 and tin-2 are respectively the target substance to be removed and the electrolysis product, tin-2 is produced at a level equal to or greater than about three times the Cr6 presence in the water, and reacts within a period of about five minutes or less with most of the Cr6 present in the water (165); the result is treated water that is ostensibly ready for delivery, recirculation, consumption or other usage, as indicated by numeral 157. As indicated by dashed-line (i.e., optional process) blocks 161 and 163, designs can be optionally optimized for commercial distribution or for private, small-scale use, and/or can be specific to tin (e.g., a tin electrode is used, whereas other metal electrodes can also be used for purposes of corrosion-mitigation or to remove by-reaction other toxic materials from the liquid being processed). As indicated by numeral 164, a number of optional processes can also be used to tailor production of substances by electrolysis, to manage electrode and system health and to detect problems, to manage cost efficiency, or for other purposes. For example, as will be discussed further below, calibration processes can optionally be used to measure electrode state and to detect problems, correct those problems and/or notify a user or operator when certain conditions exist. In some embodiments, not only do the electrodes dissolve with use, but depending on treatment chemistry, one or both electrodes might become oxidized ("passivated") or impaired by the collection of undesired substances on electrode surfaces; one or more optional cleaning processes (e.g., electrode cleaning processes) can therefore optionally be employed, to preserve electrode health and to ensure consistent, predictable electrode operation over time. These various options will be discussed further below.

Figure 2:
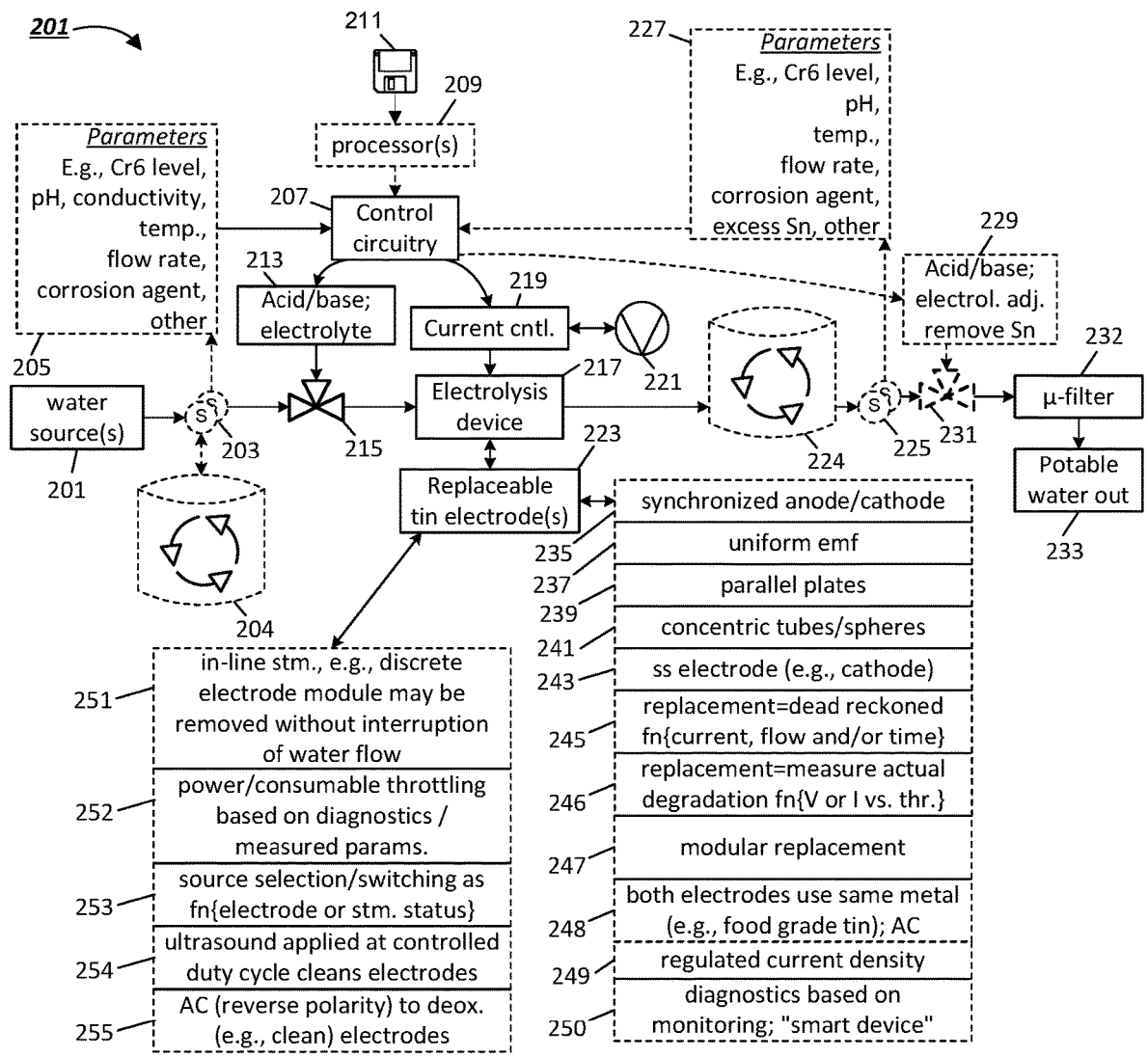
FIG. 2 is a block diagram of an embodiment of a method and system for treating water using electrolysis, in this particular case, by dissolving metal tin to form Sn-2 (stannous tin) or "tin-2" in water.

FIG. 2 shows another embodiment of a system 201 that uses electrolysis to treat water; the system 201 features a larger number of controls and options, relative to earlier embodiments. More particularly, water is received from a water source 201; one or more in-line measurement systems ("S") 203 and/or sensors intermittently measure water parameters for purposes of monitoring and control. For example, such measurement systems are often used for automated water monitoring by municipal water supplies; the systems can be configured to perform measurement at regular intervals, for example, every hour, or for every 100,000 gallons of flow, or in response to a triggering event or condition (e.g., ad hoc command from a human operator). Examples of such systems include voltametric devices used to automatically measure trace quantities of harmful metals (e.g., see the two PCT patent applications and their corresponding US national-stage entries and related publications, referenced earlier, which have been incorporated herein by reference), and see also U.S. Pat. Nos. 9,134,290 and 9,222,921, which are also owned by the Assignee of the present application. Such systems typically place an electrode in the water supply and/or they automatically extract (e.g., using a motion-controlled syringe) small measurement samples that will then be used for chemical analysis. As referenced by numeral 205, as pertinent to a toxic substance of interest (e.g., Cr6), these systems can include one or more sensors and/or devices to automatically measure parameters such as toxic substance concentration (e.g., current Cr6 concentration), water pH, water temperature, flow rate, the presence of a corrosive agent, and/or other parameters (e.g., water conductivity, redox potential or other parameters). To measure Cr6, for example (or alternatively, Se or Hg), a voltametric device such as disclosed in the two aforementioned PCT applications (and incorporated herein by reference) is adapted with chemistry specific to Cr6 species isolation and measurement, and is controlled to automatically and periodically measure Cr6 (e.g., on a cycle of every 15-30 minutes, with a resolution of 1 ppb or better, with an accuracy of +/−20% or better). Other measurement systems and/or sensors typically used include, as implied, a water flow rate meter (e.g., impeller-based, with an integrated temperature sensor) and a real-time pH sensor. Note that the various measurement systems and/or sensors can either be positioned at a water intake or main, or outtake, or alternatively, they can be coupled to a storage tank 204 which accumulates and/or blends water received at different times; in the context of a municipal water supply for example, water parameters can fluctuate significantly over the course of hours to days and the blending of water received at different times effectively averages water parameters (e.g., such as Cr6 content over time). Readings from the automated measurement circuitry 203 are fed to control circuitry 207, which stores readings and takes reactive measures when a comparison between measured parameters and associated thresholds prompts certain triggers. As noted by numerals 209 and 211, in one embodiment, the control circuitry can take the form of one or more processors and instructions stored on machine-readable media that, for example, log measurement data in a database and implement algorithms that are used to vary current and/or voltage and thereby tailor the level of electrolysis dependent on changing conditions dynamically measured in the water. As implied by these statements, the control circuitry controls electrolysis according to any desired algorithm, responsive to one or more of the measured parameters (e.g., water flow rate). In one embodiment, control can be proactive—for example, if empirical measurements detect rising toxic metal levels, electrolysis can be ramped up for a period of time (e.g., under the assumption that blended water, such as in water accumulator 204 will continue to remain below regulated norms for at least a period of time). To cite another optional example, to be discussed further below, one water source (whether or not having a specific target substance such as Cr6) can be treated if the treated water is to be blended with another water source, e.g., that does feature the target substance of interest. To cite another example as to the use of customized control algorithms, if it is determined that toxic metal presence deterministically varies dependent on other parameters (e.g., month, week, temperature, water table level, or any other desired factor), the control algorithm implemented by circuitry 207 can automatically vary electrolysis parameters to provide correlated adjustment dependent on current or predicted values of these other parameters. Many optional variations of the techniques discussed herein are possible.

To provide one illustrative example of adjustment or control of electrolysis parameters, for tin-2 to react and consume Cr6 present in the water, it is generally desired to have a pH of 4-to-9. To this end, in one embodiment, the control circuitry 207 can receive and automatically process pH readings, e.g., taken every hour, every few minutes, or on another basis for water in (or leaving) the tank 204; to adjust pH to this range of 4-to-9 for purposes of the desired reaction, the control circuitry automatically prompts and controls the addition of acid or base 213, via one or more in-line valves 215, such that water entering the electrolysis device 217 has the desired pH. Note that in other embodiments, this optional technique may be unnecessary or cost prohibitive. For example, potable water is typically processed by large water distribution networks to have a pH of between 7 and 8; in some implementations where the water source has a regular pH with a high degree of reliability, pH measurement and responsive adjustment of electrolysis parameters may be unnecessary. A relatively low flow rate (e.g., inexpensive) electrolysis device designed for private use may omit pH measurement entirely if an input water supply can be reliably assumed to have an acceptable pH. Note that these parameters can vary for other toxic metals of interest; for example, in the specific case of selenium, reduction can benefit from an acidic environment, and therefore, in an application directed to the reduction or removal of Se (see the discussion of FIGS. 13A-13C, further below), the pH of the aqueous matrix of interest can be regulated to a range suitable for the reaction of interest, e.g., 1.3+/−0.5, with a stannous ion production driven to desired levels (e.g., to about 5-20×, or more, relative to the anticipated concentration of selenium, for applications premised on fast, or near instantaneous conversion).

As another example, to maximize cost efficiency in generating the reagent of interest, water conductance (conductivity) can be tested and adjusted as necessary. Because the techniques described herein use electrolysis, effective reagent production can require larger or smaller currents for a given level of Cr6 neutralization, depending on water conductivity. For a low flow rate electrolysis device (e.g., designed residential usage), variation in power consumption may not be a significant factor (and conductance measurement can be optionally omitted), but for a very large scale system, it may be desired to adjust water conductivity, so that less power is needed by (and is consumed by) the electrolysis process. To this effect, a large water distribution network may choose to use a conductivity sensor and may choose to add a given amount of electrolyte (e.g., from a source represented by block 213) so as to increase conductivity of the water prior to treatment if measurements indicate conductance below a threshold level; in one embodiment, this source can be a saline solution which adds a relatively low amount of salt to the water (e.g., at levels not detectable by human senses) but which nevertheless permits significant power savings. This embodiment can be combined with other embodiments described herein, e.g., it is possible to add a relatively high-level of electrolyte to water from a source having a relatively high amount of Cr6 (and thereby efficiently produce reagent), while blending water from multiple sources so that the electrolyte presence is undetectable; the water can also be treated to remove excess electrolyte after target substance (Cr6) neutralization. Many such examples will occur to those having ordinary skill in the art.

To cite yet another example, as noted earlier, the greater the concentration of the target substance (e.g., Cr6) in the water, the greater the desired production of tin, and thus, the depicted control circuitry also optionally responsively varies current and/or voltage 219 so as to throttle up or down the level of electrolysis applied to release tin into the water in proportion to target substance concentration. As indicated by numeral 221, this control can be achieved by controlling a current source, which changes the current density to be applied to the anode(s) of the electrolysis device 217. As noted by numeral 223, optionally in one embodiment, the anode is configured to be in the form of a replaceable module, which for example can be easily replaced (and/or replaced without taking the water system off-line) as the electrode nears the end of its lifetime.

To reduce toxic metal presence, a stannous ion (e.g., $HSnO_2^-$) is formed in the water as it passes through the electrolysis device 217 in quantities that take at most minutes to react with and consume the bulk of the toxic metal present in the water (e.g., Cr6, Hg and/or Se). To this end, water from the electrolysis device is passed to a contactor (e.g., storage) 224 which stores the water or otherwise provides time for the stannous reagent to react with and consume the toxic metal of interest, e.g. Cr6, with an average retention time of several minutes (e.g., at least 5 minutes). The configuration of the contactor can vary dependent on embodiment—for example, in a residential application, the contactor can take the form of a radiator or a water storage tank having a capacity of a few (e.g., 1-25) gallons. In a commercial application, the storage capacity can be larger, e.g., a hundred thousand gallons or more. Note that it is also possible to blend treated water with untreated water in the contactor 224, e.g., in one embodiment, a first stream of untreated water is added to the contactor 224, while a second stream is treated in a manner so that a relatively large quantity of stannous material is added to the water (i.e., to form a reagent concentrate); the amount of stannous material added is sufficient to treat both the water in the second stream, as well as the water in the first stream as the two are mixed in the contactor 224. As a non-limiting example, if it is assumed that the two streams have equal volume, then tin could be added to the second water stream at a rate corresponding to twenty times (20×) the concentration of Cr6 present in either stream; once blended with untreated water in the contactor 224, this will result in blended water having tin-2 present in a 10× ratio relative to Cr6 present in the water source, with the result that the entire water supply is treated to remove Cr6. As these statements imply, the contactor 224 can take the form of any storage or distribution system which allows tin to react with a water stream, and/or permits two or more streams to commingle over an interval of time.

Water from the contractor 224 can then at some point be output for distribution and/or usage. An optional second set of sensors/measurement devices 225 is then also used to monitor water for safety and/or regulatory compliance and/or other parameters (such as pH). For example, it was earlier mentioned that pH ideally is 4-9 to maximize efficiency of the electrolysis device in producing tin-2 for Cr6 removal, but that potable water is typically adjusted at some point to have a pH that is ideally 7-8; the chemical process which converts Cr6 to Cr3 typically raises the pH once again (due to consumption of certain amount of proton on cathode), but sensors/measurement devices 225 can be used to test pH to ensure optimal values (e.g., pH of 7-8 in the case of water output by a municipal water supply). To this effect, note that measurement of parameters 227 is once again passed to control circuitry 207, which can treat the water to adjust pH by automatically commanding the addition of acid or base as appropriate. Note also that parameters 227 and function block 229 reference optional acid/base adjustment, electrolyte adjustment and/or tin removal. In this regard, while there are at present no regulatory limits for low levels of tin in drinking water, the system 201 can be advantageously designed to remove excess tin using one or more microfilters 232. This will be further discussed below in connection with FIG. 6. This is to say, tin-2 is somewhat unstable and over time converts to insoluble tin-4; this reaction can be accelerated by adding chlorine to the water (e.g., to also disinfect the water) or by adding another suitable reagent. The output of the process, as denoted by numeral 233, is potable water ready for use or distribution.

Numerals 235-255 illustrate a number of further options associated with the design represented by FIG. 2. First, as represented by numeral 235, in one embodiment, the cathode and anode use for electrolysis are synchronized, meaning they are designed and arranged relative to each other to produce a uniform electric field (e.g., so as to generate tin-2 in an efficient manner suitable for electrolysis of flowing water); in this regard, the anode and cathode can be matched, so as to have reciprocal surface area with a consistent distance between anode and cathode, such that tin-2 is generated at a very predictable rate given assumed electrode current density over the anode's entire surface area. Designs suitable to this end will be further discussed below in connection with FIGS. 4A-4D. As referenced by numeral 237, the cathode and anode, whether or not synchronized in this manner, can be designed to produce a relative uniform electric field, once again, to efficiently and uniformly distribute the current along the electrode surface and produce tin-2 given expected current flow. Per numeral 239, in one embodiment, the anode and cathode are configured as parallel plates, with water flowing there between; in another embodiment, represented by numeral 241, the anode and cathode can be configured as concentric tubes, or can be implemented as spherical electrodes. In yet another embodiment (243), one anode (such as the cathode) can optionally be made of a corrosion-resistant conductive material, such as stainless steel or another suitable conductor. Still further, in one implementation, an operator of the system 201 is notified of the need to replace the anode and/or an anode module on a dead reckoned basis 245, that is, in a manner dependent on time (e.g., an LED is illuminated "every four months"), water flow (" . . . every 10000 liters"), applied current or power, and similar factors based on assumed degradation. It is also possible to dynamically measure electrode actual degradation using electronic techniques (e.g., a predefined relationship between time and current can be tested, with variation in this relationship correlated with actual electrode degradation, and with measurement of parameters used to directly or indirectly measure electrode state). For example, as a tin electrode (or other electrolysis material) is consumed, it is expected that electrolysis parameters and/or reagent generation efficiency will change over time—in one embodiment, the control system is designed to test for this and notify an operator when it is time to replace the anode when a certain degradation threshold is met, as indicated by numeral 246. As noted earlier, in one contemplated design (e.g., for small-scale and/or residential use), one or both electrodes are made to be a replaceable modular component (247) of an in-line system, such that the modular component can be removed without interrupting the flow of water, 251, and without need to replace or remove the entire electrolysis system. In one embodiment, as referenced by numeral 248, both electrodes can be made of the consumable material (e.g., tin metal electrodes), with an electrode module (or modules) being made so that each electrode wears at the same rate as (or in proportion to) the other. For example, in one contemplated design, a replaceable electrode module features two electrodes, each made of food-grade tin (e.g., to treat Cr6) and the electrolysis unit operates using alternating current (e.g., periodically-toggled polarity) so that each electrode periodically serves both as anode and cathode (i.e., with reciprocal duty cycles). Advantageously (and as further referenced by optional process block 255), such polarity reversal can serve a purpose of deoxidizing ("de-passivating") a consumable electrode (e.g., when operated as a cathode), thereby enhancing electrode health and reagent generation efficiency. In addition, use of both electrodes to produce the desired reagent (e.g., stannous tin) can yield efficiencies in terms of maximum reagent production as a function of consumed power. In a typical embodiment, it is contemplated that the alternating current ("AC") frequency (e.g., the toggling of electrodes polarity) will be on the order of 0.0016-1 hertz, e.g., with DC system essentially switching electrodes on the order of once per second to once per six hundred seconds; as will be understood by those having ordinary skill in the art, in such an embodiment, the polarity reversal is typically performed often enough to provide effective electrode deoxidation, while at a sufficiently low frequency that approximates a maximum reagent generation as function of consumed power. Per function block 249, in one embodiment, electrode current density is regulated so as to maximize reagent generation efficiency, with the control circuitry 207 adjusting reagent generation parameters (e.g., voltage and/or current) so as to maintain current density at one or both electrodes (e.g., at the anode).

Numeral 250 indicates that one embodiment provides for a "smart device" that performs self-tests as appropriate so as to maintain electrode health, adjust reagent generation parameters as necessary, notify a user when it is time to have one or both electrodes replaced (e.g., or provide an indication of remaining useful life derived from monitoring of measure parameters or change over time in measured parameters), or to signal errors or other conditions. In one embodiment, such a device can be made "Internet ready," such that it can be remotely interrogated and/or send alerts dependent on device state. In one embodiment, such a system for example can send a text or email alert when it is time to replace an electrode or where an error is encountered. Such functions are typically automated by software which controls one or more processors of the control system. In a variation, the system 201 can be designed so as to compensate for "up to" a certain concentration of target substance (e.g., Cr6) and can send an alert based in in situ measurements of the target material warning that detected presence exceeds compensation capabilities of the system. In another variation, the system is designed so as to periodically and automatically (or on an ad hoc demand-basis) perform certain measurements/calibrations and adjust electrolysis and/or other system parameters (including pH and/or conductivity) automatically depending on the results of the measurements/calibrations. Once again, these functions can optionally be performed under control of a processor (or other circuitry) implementing suitable instructional logic, stored on non-transitory machine-readable media.

As referenced by numeral 252, not only can conductivity be adjusted to maximize reagent generation efficiency, but in some embodiments, power/consumable production can be throttled to save power. As an example, in an embodiment that detects actual toxic metal concentration, power can be throttled in a manner that produces by electrolysis only that amount of stannous ion necessary to reduce toxic metal presence to a predetermined level (e.g., to within regulatory limits); if a regulatory limit is 10 ppb for Cr6, for example, and Cr6 presence is already close to the regulatory maximum, power can be throttled back so that only that amount of stannous tin is consumed which is necessary to bring Cr6 presence to within safe limits. Per numeral 253, it is also possible to switch source selection (or source combination) based on detected Cr6 presence. For example, if a first stream of water from a less-expensive source is detected to have Cr6 presence in excess of the compensation capabilities of the system 201, water can be drawn from a second (e.g., more expensive, less preferred) source and blended with the stannous-treated water so that Cr6 concentration in water from the blended streams is reduced to within safe limits; when and as Cr6 presence in the less-expensive source declines to a level matching the compensation capabilities of the system, the more expensive source is deselected and/or throttled back, so that water is increasingly drawn from the less expensive source.

Figure 7A:
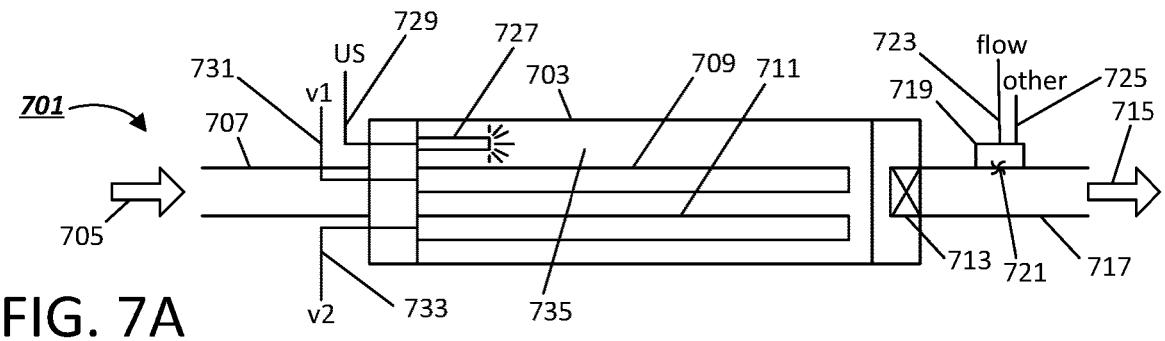
FIG. 7A shows one embodiment of an electrolysis device where ultrasound is used to renew an electrode surface.
Figure 7B:
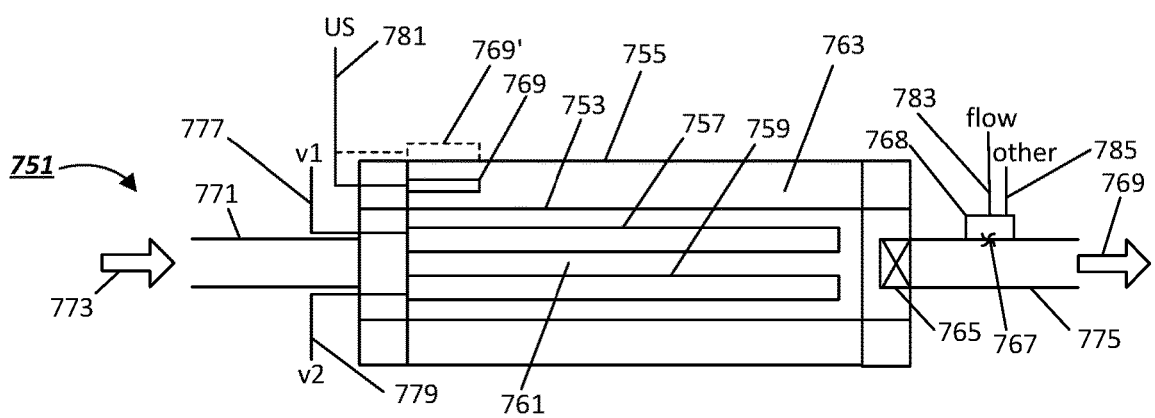
FIG. 7B shows another embodiment of an electrolysis device where ultrasound is used to renew an electrode surface.

Finally, as referenced earlier and by optional process block 254, some embodiments rely on ultrasonic cleaning to strip accumulation from the surface of the tin electrode(s). Briefly, in some cases, as reagent is produced, stannic oxide as it forms accumulates on the electrode surface(s), impeding the further generation of stannous tin; to address this, in some embodiments, ultrasound can be applied intermittently or periodically so as to strip this particulate and renew the electrode (e.g., anode) surface. This option is further discussed below in connection with FIGS. 7A-7B and 10, but briefly, even a few minutes of operation can cause particulate to accumulate on the electrode's surface(s), resulting in a drop in reagent generation efficiency over time (see FIG. 10). To address this, in one embodiment, not just one, but two or more separate cleaning processes are performed, including one based on polarity reversal (referenced again by numeral 255), to deoxidize the electrodes, and one based on an ultrasonic stripping process (represented by numeral 254). The inventors have found that a duty cycle for ultrasonic cleaning of approximately five seconds for every thirty seconds of stannous ion production (e.g., with an ultrasonic frequency of approximately 40 khz) is effective to maintain a fresh surface of the consumable and maintain reagent generation efficiency, as noted by line 1003 in FIG. 10. As shown in FIGS. 7A and 7B, ultrasound can be effectively delivered to the electrodes via the aqueous matrix being treated, e.g., by immersing an ultrasonic transducer in that aqueous matrix (e.g., proximate to the electrodes, as represented in FIG. 7A, or by immersing the entire assembly (e.g., including a housing) in an ultrasonic bath, as effectively represented by FIG. 7B. Note that other cleaning processes can be used and/or other ultrasound generation or delivery mechanisms can be used, depending on embodiment. These options will be further discussed below.

Figure 3A:
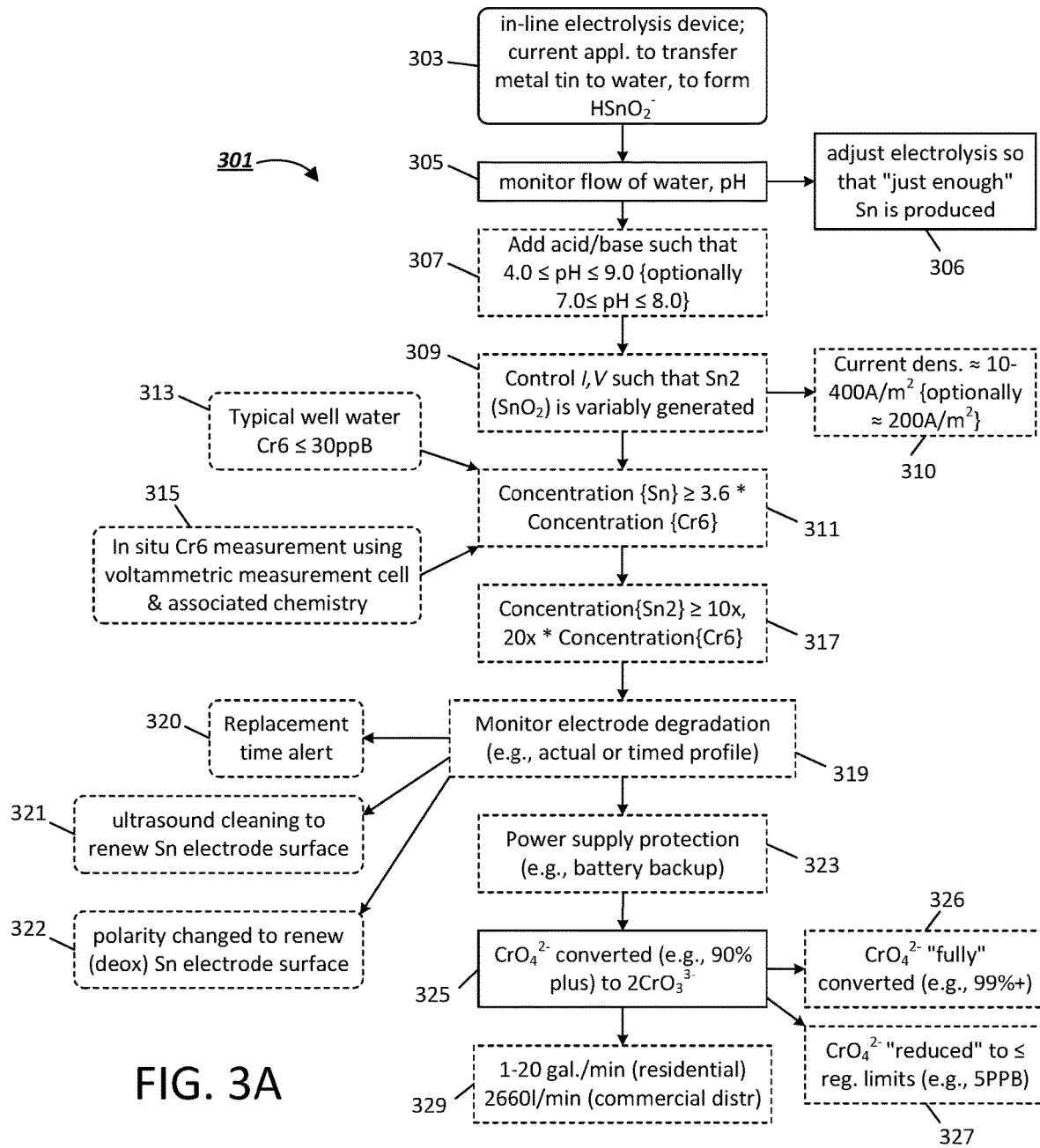
FIG. 3A is a flow chart of one method that uses electrolysis to dissolve tin into water, to thereby convert Cr6 (in this example) to trivalent chromium (Cr3).

FIG. 3A is a flow chart showing a method of operation 301. Per numeral 303, the method is predicated on the use of an in-line electrolysis device which applies current to metal Sn so as to electrolyze the metal tin and form stannous ion in water (in this case, $HSnO_2$). Once again, the use of metal tin to form a reagent is to be considered optional, and other metals and materials may be used dependent on the target substance that is to be removed or reduced, and depending on the chemistry associated with the removal process. The method then monitors one or more factors associated with producing the "right amount" of reagent, and associated efficiency of the electrolysis process (e.g., such as may depend on the flow rate of the water to be treated, whether the pH and/or current density is out of band, and other factors, as indicated by numeral 305). As noted earlier, it is generally desired in the case of electrolyzed metal tin to regulate the process such that tin-2 is produced instead of undesired tin-4. Note that the method as depicted in this FIG. does not measure for actual Cr6 concentration which may be present, e.g., in a typical residential application, it can be presumed that a "worst-case" level of a target substance are present, e.g., an amount that would never be reached under ordinary conditions (e.g., 30 ppb, per numeral 313) and the method can be optionally designed to "always" treat according to this presumed concentration. In other applications, particularly large-scale applications (e.g., commercial water distribution applications), the method can also dynamically perform in situ measurements 315 for actual Cr6 (or other toxic metal) presence, and can adjust electrolysis parameters (e.g., voltage, current) in dependence on measured results. Per numeral 307, if the pH of the water is outside the optimal window, the system automatically adds acid or base (i.e., before or after treatment) so as to adjust pH to the desired value. Dependent on water flow rate, the voltage and/or current used for electrolysis is then adjusted so as to generate tin-2 at a desired level, per numeral 309. For example, it is expected (310) that an anode current density of 10-200 amps/meter-squared at a low voltage (e.g., <20 volts, and in an ideal case, <3 volts) should be sufficient to generate tin-2 at desired levels. Per numeral 311, in a one contemplated application (specific to Cr6), the water is treated so as to add at least 3.6 times (molar ratio) the amount of tin-2 to the water than the amount of Cr6 present. Thus, returning to the example just presented where a "worst-case" of 30 ppb is assumed, a residential system might be designed to always produce tin by electrolysis in a concentration of no less than 370 ppb (i.e., the primary chemical reaction $2CrO_4^{2-}+3HSnO_2^-+5H_2O=2CrO_3^{3-}+3Sn(OH)_6^{2-}$ implies 1.5 times as much tin is required as chromium, and since ppb is typically determined by weight, the result is multiplied by the atomic weight ratio of tin/chromium, leading to the calculation of 30 ppb×1.5×3.6× 118.710/51.9961≈370 ppb). In other implementations, per numeral 317, the ratio used for adding tin-2 to water can be selected to be even greater, e.g., 10 times or even 20 times actual (measured) or dead-reckoned (e.g., static or predicted) Cr6 levels.

The method also advantageously monitors actual electrode degradation, per numeral 319, and provides an alert or indication 320 when it is time to replace an electrode (e.g., the anode and/or cathode). This is to say, the electrolysis breaks down the consumable tin electrode so that its constituent material dissolves into the water, and eventually, the electrode dissolves to the point where its function is compromised. The alert provided can be dependent on the type of implementation, e.g., an audible beep or LED indication or other notification can be provided for private or building applications, or for a smart application, a text alert can be sent; for large-scale applications, an email or error message can be automatically generated and sent via a wide area network (WAN) to a human operator, e.g., by preconfigured email or automated voicemail. Note also that the method may optionally actively monitor for actual electrode degeneration and disfunction, e.g., using voltage and/or current monitoring techniques as alluded to earlier; this may be preferred for commercial applications, e.g., where a high-volume flow system might have to be taken offline for electrode refurbishment or replacement, and where it might be desired to obtain as much use as possible from late-life electrodes. Numerals 321 and 322 represent respective optional techniques for electrode cleaning for purposes of electrode renewal (e.g., using ultrasound and/or polarity reversal, as described earlier). Numeral 323 references the fact that an embodiment optionally relies on a battery backup system, e.g., such that tin-2 can still be produced in desired quantities during periods where power is lost, optionally with full function monitoring of Cr6, pH, water flow, etc. The result of the process, referenced by numeral 325, is that Cr6 is converted (e.g., more than 90% of original material is converted) to trivalent chromium; in other embodiments, the reaction can be driven to the point where substantially all Cr6 is converted (e.g., 99% plus, as indicated by numeral 326), or where Cr6 is otherwise reduced by an amount or percentage sufficient to comply with regulatory requirements (per numeral 327), thereby reducing toxicity of the water. Note that FIG. 3A also references illustrative flow rates associated with large and small scale electrolysis, respectively on the order of thousands of gallons per day, or more, and a few hundred gallons of water per day, or less, as indicated by numeral 329.

Figure 3B:
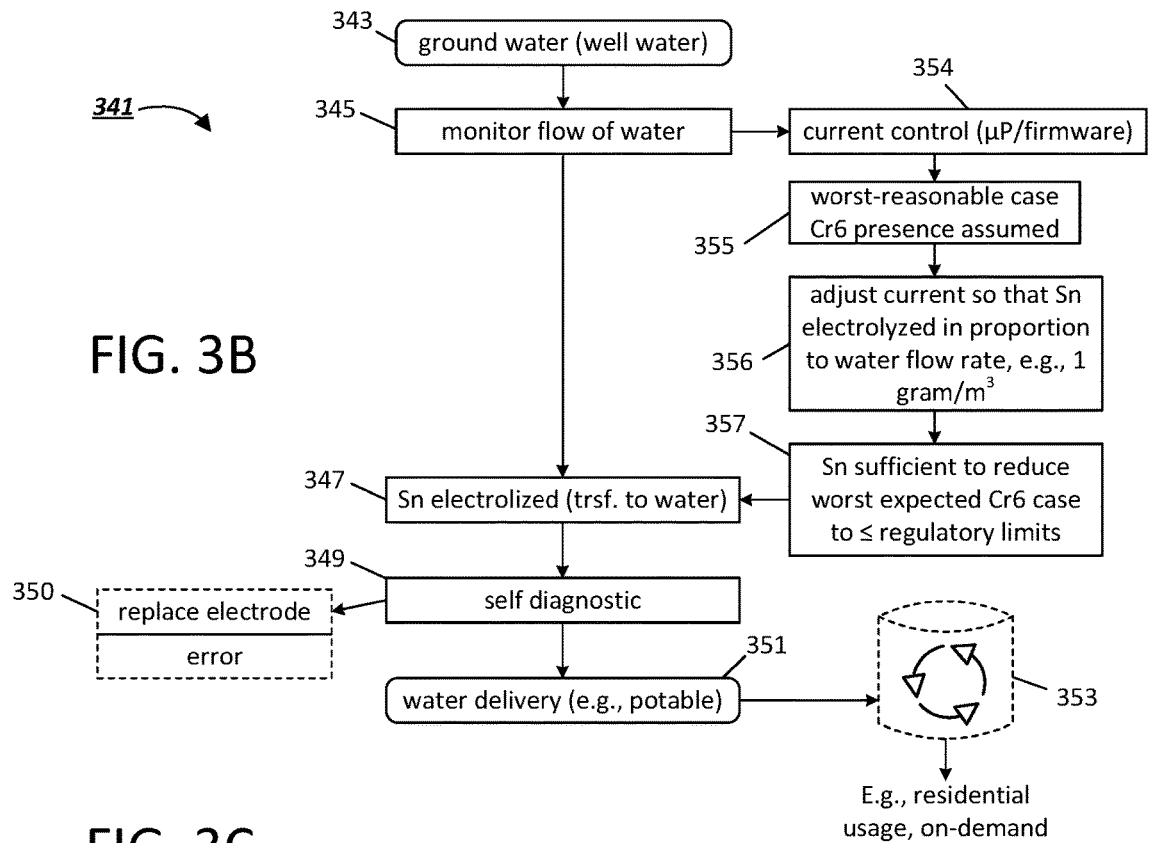
FIG. 3B is a flow chart of another method that uses electrolysis to dissolve tin into water, to thereby convert Cr6 to Cr3.

FIG. 3B shows another embodiment, this time referencing a typical small scale electrolysis system and method, generally represented by numeral 341. Ground water is supplied, e.g., from a well, as indicated by numeral 343, ultimately for delivery for use as potable water, per numeral 351. Water is treated by an electrolysis system as has described earlier, and as is indicated by numeral 347. Treated water can be accumulated and stored (e.g., in a tank or cistern) or that water can be immediately distributed, per numeral 353. In this case, a conservative "worst-case" toxic metal presence is assumed (e.g., Cr630 ppb), per numeral 355; depending on system and implementation, this assumed worst-case can be made to very over time (e.g., dependent on water table level, season, and/or other factors which have been correlated in advance with Cr6 presence).

The electrolysis device can be one designed for installation where water enters a building (e.g., an apartment building, a residence or commercial building), or indeed, at any location between water source (e.g., well) and the point of distribution/consumption. In this regard, flow rate of the water is monitored, per numeral 345, with firmware adjusting electrolysis parameters so as to regulate reagent production to match planned worst-reasonable-case need, per numerals 354 and 355. For example, firmware (and an associated processor) can, responsive to the rate of water flow, regulate current so that Sn is electrolyzed at the rate of approximately 1 gram of metal tin per cubic meter of water, per numeral 356; generally speaking, the electrolysis is controlled so as to generate enough reagent so as to reduce the target substance to less than regulatory limits, per numeral 357; for example, if the assumed worst-reasonable case is 30 ppb, and the regulatory maximum is 5 bbp, enough reagent is generated so as to remove 25 ppb of the target substance from the water, or otherwise render it non-harmful. Per numeral 349, the electrolysis devices is configured to perform self-diagnostics, and as indicated by numeral 350, it notifies a user or operator when it is time to perform maintenance (e.g., electrode replacement) or when an error requires attention or intervention.

Figure 3C:
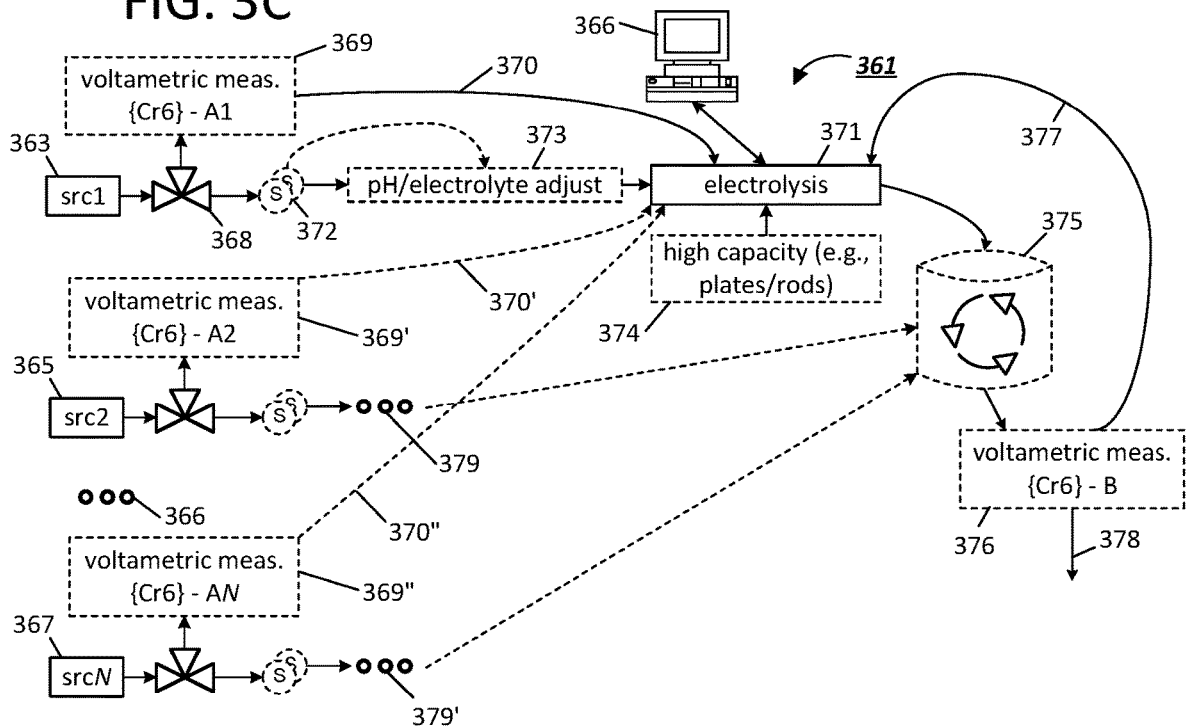
FIG. 3C shows yet another embodiment that uses electrolysis to dissolve tin into water, to thereby convert Cr6 to Cr3.

FIG. 3C shows another embodiment, generally designated by reference numeral 361. A water distribution network generally shown in the FIG. draws water from a number of different sources, source 1 (src1, also numbered 363), source 2 (src2, also numbered 365) and potentially up to, and including, source N (srcN, also numbered 367). Each water source should be assumed to have different chemical and mineral constituency, such that each source might have a different presence of a target substance that is to be removed (e.g., again using Cr6 as an illustrative example). The system also includes at least one voltametric measurement system, 369, 369' and/or 369" which detects the toxic metal concentration of interest in a manner specific to each source, or based on blended water, 376, such as in connection with a water storage tank 375 or other point in the distribution of the blended, treated water, and prior to distribution (378). All of the depicted, optional voltametric measurement systems may be present, just one of them, or indeed, any combination of the depicted measurement systems. Each voltametric measurement system is advantageously of a type generally described by USPB 20180136161, referenced earlier, and is configured to measure Cr6 (or other toxic metal) presence by periodically or intermittently drawing samples from an inline valve (e.g., 368) and using voltammetry to measure concentration on the basis of an electrochemical reaction.

The depicted water distribution network also includes at least one electrolysis device 371 that is configured to generate reagent in a manner that neutralizes or removes a target substance, which once again is Cr6 in this example. In this case, the electrolysis device 371 is optionally based on parallel electrode plates (e.g., where alternative anode/cathode parallel plates can have one or more metal tin electrodes, for example, as additionally described in connection with FIG. 4B, below); each source 363, 365, . . . 367 can have its own electrolysis system such as system 371 in-line, such as denoted by ellipses 379 and 379', or alternatively, system 371 can be configured to receive blended water (i.e., per optional flow arrows 370' and 370"). Also, any subset or permutation of the sources can have dedicated electrolysis systems (this is also represented by ellipses 379 and 379"). As denoted by numerals 372 and 373, each electrolysis system 371 optionally is accompanied by sensors 372, which measure for pH and/or conductance, and which responsively cause selective addition of acid, base and/or electrolyte, so as to provide for a desired pH, and so as to satisfy a minimum threshold for conductivity of the water being treated (e.g., at least 100 microSiemans (µS) or higher, and preferably at least 200 µS, or higher). As was the case earlier, adjustment of pH can be performed simply by injecting diluted acid or base or electrolyte (e.g., a salt solution) into the aqueous matrix of interest (e.g., water in this example); each of the injected substances can be supplied as a consumable, with delivery relying on an electrically-actuated valve and bleed line which adds a controlled flow of the pertinent substance, dependent on flow rate of the liquid being treated.

FIG. 3C presents a number or control configurations and options that can be used by a water distribution network. First, as implied, it is possible to add electrolyte to water from one source dependent on measured characteristics of water from another source. For example, if it is assumed that src1 has no Cr6 presence, but that src2 has been determined to have undesired Cr6 levels, then the control system 366 for electrolysis system 371 can cause this electrolysis system 371 to add reagent to water from src1 to compensate for Cr6 presence in src2. In fact, as implied by the FIG., each electrolysis system (371) can be controlled (individually or in any desired grouping) so as to compensate for Cr6 (or other toxic metal) presence across any combination of sources 1-N. Second, electrolysis can be controlled based on feedback, as implied by flow path 377; that is, it is possible to measure for Cr6 presence at one or more outputs (378) of the water distribution network and marginally adjust reagent generation in a manner that drives Cr6 presence to a desired level (e.g., no more than 5 ppb). Naturally, it is also possible to use an algorithm which combines data from multiple measurement points in the water distribution network; to cite a non-limiting illustrative example of this, an electrolysis system in line with the delivery of each source could be controlled (responsive to optional voltametric measurement systems 369, 369', 369") to reduce Cr6 levels for each source to ≤10 ppb, while feedback path 377 could be used to provide a second threshold that invokes heightened levels of reagent generation if ≥5 ppb is detected in the blended output (378). Many similar examples are possible and will depend on the configuration of the particular water distribution network and desired results.

FIGS. 4A-4D show a number electrode configurations that can be used for an electrolysis system. These designs should be viewed as non-limiting, e.g., other variations will readily occur to those having skill in the art but are nevertheless contemplated by this disclosure.

Figure 4A:
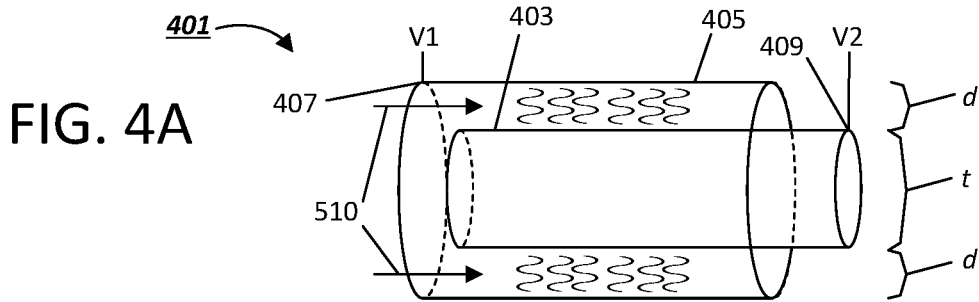
FIG. 4A is an illustrative diagram that shows an electrolysis device based on concentric electrodes; the top of the figure generally illustrates this structure while the bottom of the figure shows various illustrative ways of implementing such a structure.

FIG. 4A illustrates an embodiment 401 where an anode and cathode are configured as concentric tubes, 403 and 405 respectively. That is, a first, outer tube (a stainless steel cathode in this case) is connected to a first terminal 407 (carrying potential V1) while a second, solid wire having thickness (e.g., diameter) t is connected to a second terminal 409 (carrying potential V2). Note that the concentric tubes 403 and 405 are configured so that a substantially constant distance (d) exists between the anode and cathode, e.g., the depicted electrodes are said to be synchronized or matched and generate a substantially uniform and constant electric field along their substantially-common length. As represented by arrows 410, water to be treated travels in between these tubes with the electric field (EF) passing through the water, in a direction normal to its flow direction. The EF causes solid metal tin to dissolve into the water. In a small-scale (e.g. residential) application, t will be on the order of one centimeter or less, whereas for a large-scale application, t may be on the order of 1-2 inches, or more. Similarly, in a small-scale (e.g. residential) application, d will be on the order of about one centimeter, so as to provide for a reasonable rate of flow, whereas for a large-scale application, d may be on the order of an inch or more.

Arrows 411 are used to show two associated concentric tube implementations. First, as seen at the right-side of the figure, the concentric tubes can be configured as a preconfigured pipe which is adapted for modular connection using respective sets of pipe threads 413 and 421; in this example, the pipe threading not only provides for a water-tight seal, but it also provides for electrical contact so as to provide electrical connection to the anode and cathode. For example, the anode can be concentrically-mounted within outer pipe 413, in a manner centrally-supported by a bridging conductor 422 and a bridging insulator 423. The conductor electrically couples the anode to threading 421 while isolating the anode from threading 415, all while permitting water to flow within outer pipe 413. At the same time, threading 415 electrically couples to the outer pipe 413, which serves as the cathode, while an insulator ring 419 electrically isolates a terminus 417 of the cathode from threading 421. This example shows a case where modular engagement of a replacement unit (e.g., the depicted pipe) facilitates both electrical and water-tight connections, e.g., facilitating modular replacement in (e.g.) a small scale application such as a building-scale application. Numerals 425, 426, 427 and 428 take this a step further and show that such a concentric pipe can be configured optionally as a coil 426 within a housing 425; that is, as the modular unit comprising the housing 425 and coil 426 is replaced (e.g., screwed-in/unscrewed), its connection forces ingress and egress paths (and associated electrical contacts) to necessarily align with an in-line unit (e.g., such as the component 505A discussed below in connection with FIG. 5A). Taking a second example, depicted at the left-hand side of the figure, the concentric tubes can be configured for single-ended (e.g., cylindrical) attachment. That is, as depicted, water flows as represented by arrows 441; in the depicted example, the anode 437 is a somewhat thick but hollow tube, e.g., water travels through its central bore 439 toward the base of the assembly 440, where it is recirculated upward, in between the outer circumference of the anode and the exterior tube 431 (i.e., the cathode). Once again, a threaded coupling 433 can be used to attach and detach the electrodes as a module, with an inner seal and electrical contact 435 being use to effectuate both a water-tight connection as well as an electrical connection to the anode (which is isolated from the water's return path and outer tube/cathode 431). The depicted configuration is seen to have a consistent anode thickness t and a consistent distance d between the anode and cathode, such that the electrodes are once again optionally synchronized or matched. This second example once again shows a modular unit that is well-suited to small-scale (e.g., building or single-family dwelling applications).

Figure 4B:
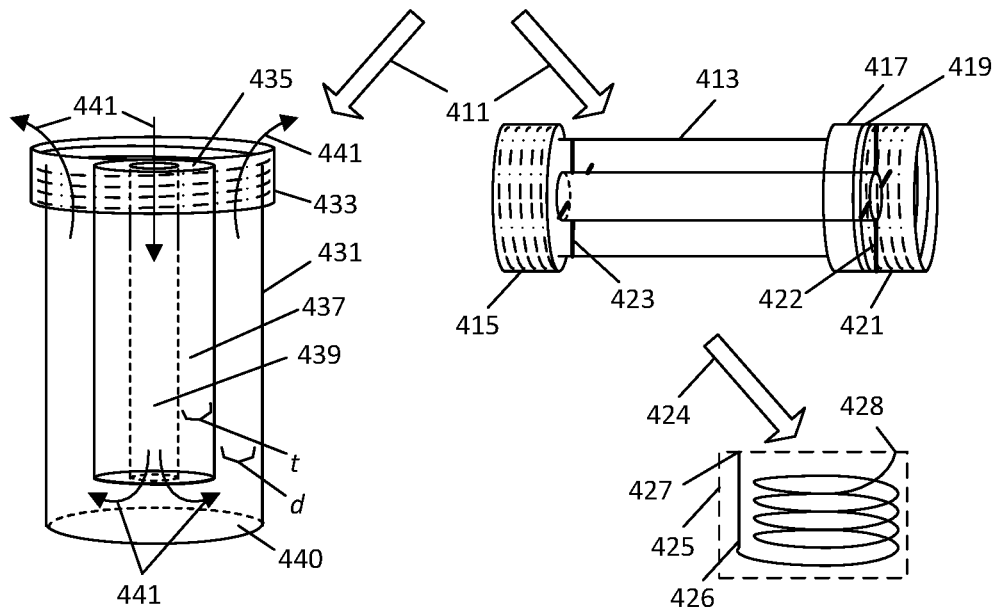
FIG. 4B is an illustrative diagram that shows an electrolysis device based on parallel plates 459 and 461.
Figure 4B:
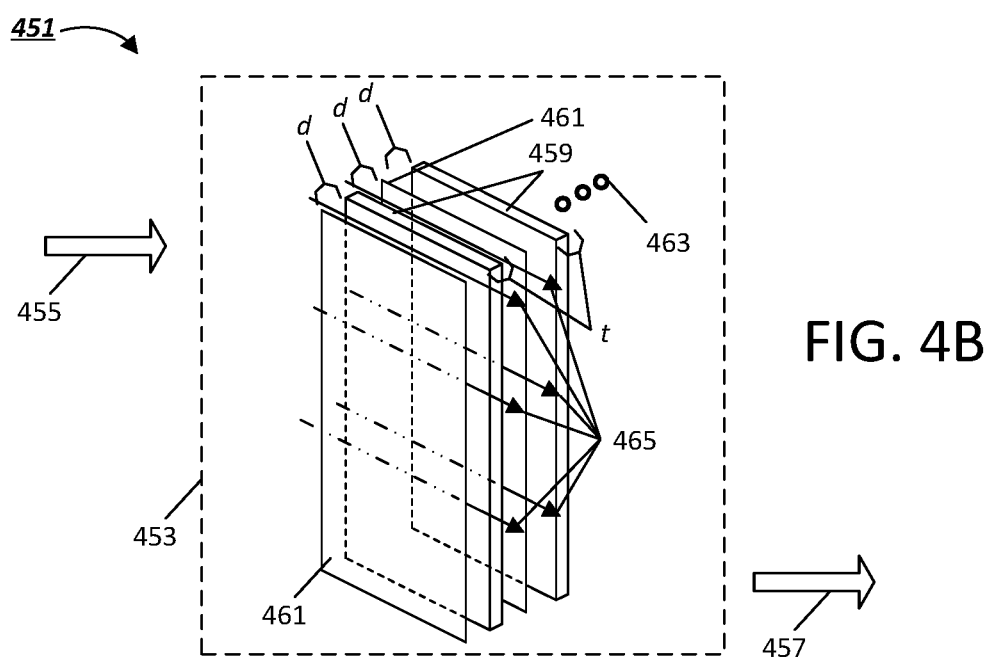

FIG. 4B shows an embodiment 451 that relies on parallel plates to serve as anode and cathode. More specifically, the figure shows a housing 453, a water ingress path 455 and a water egress path 457. The housing mounts the various plates, with water flowing between the plates as represented by arrows 465. The anodes are represented as relatively thick plates 459 made of tin and having thickness t, while the cathodes are represented as relatively thick plates 461, each separated from one or two anodes once again by distance d. As this example demonstrates, the anode-cathode relationship can be optionally configured as an "anode sandwich" (i.e., one anode sandwiched between two cathode plates, thereby presenting two water flow paths), a "cathode sandwich" (e.g., one cathode sandwiched between two anode plates, thereby presenting two water flow paths), or many plates of alternating anodes and cathodes. For a commercial application, the anodes can be made relatively thick (e.g., an inch or more, with an inch or two (or more) separation between plates, such that the anode wears out uniformly and symmetrically over time, producing a consistent electric field; once again, in this example, the anode and cathode can be made to be synchronized or matched. To refurbish a system of this type, in a large scale application, the housing can be configured to slidably-receive the anode plates as panels with a spring-loaded framing mechanism, e.g., to place each anode panel exactly between opposing cathode plates and to provide for suitable electrical connection; the system is taken offline as the anode plates wear thin, and new, thick plates of metal tin are used to replace thinner, worn plates. In an AC system (i.e., where every plate serves double duty as both anode and cathode), each of the plates can be individually configured for modular, panel-specific, spring-loaded replacement in this manner.

Figure 4C:
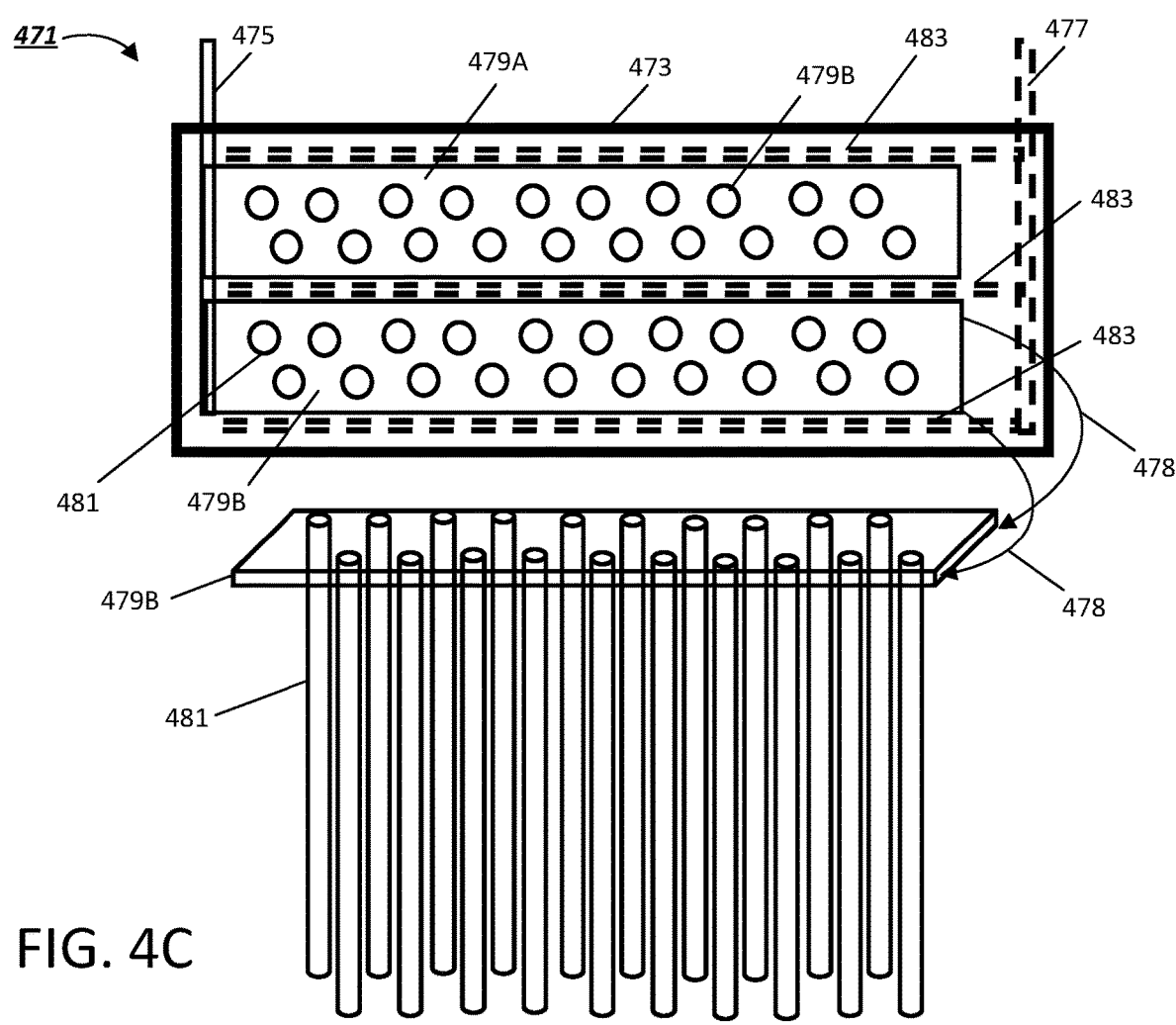
FIG. 4C is an illustrative diagram that shows an electrolysis device based on the use of metal rods 481.

FIG. 4C shows still another embodiment 471, this time predicated on the use of relatively thick tin rods (481) as anodes. More particularly, the top portion of the figure shows a top-plan view of the assembly, including a housing 473 and electrical terminals 475 and 477 for the anodes and the cathode, respectively. Terminal 475 electrically couples to two conductive mounting plates 479A and 479B, which each mount a multitude of solid metal tin rods (e.g., 481), while terminal 477 electrically couples to vertical cathode plates 483. Arrows 478 represent an action where part of the assembly 471 is turned over to provide a perspective view of one of the mounting plates 479A, and associated tin rods, as seen at the bottom portion of the figure. The cathode plates 483 (not seen at the bottom of the figure) are positioned parallel to the drawing page on either side of the tin rods (e.g., 481). Water flows in this configuration in between the rods, from left-to-right relative to the drawing page, with the generated EF extending between the tin rods and the vertical cathode plates 483. In a typical implementation, the rods 481 are an inch or more in thickness and are designed to support high-flow rates consistent with large scale applications. The anode(s) are replaced by removing and replacing the mounting plate/rod assembly seen at the bottom of the figure.

Figure 4D:
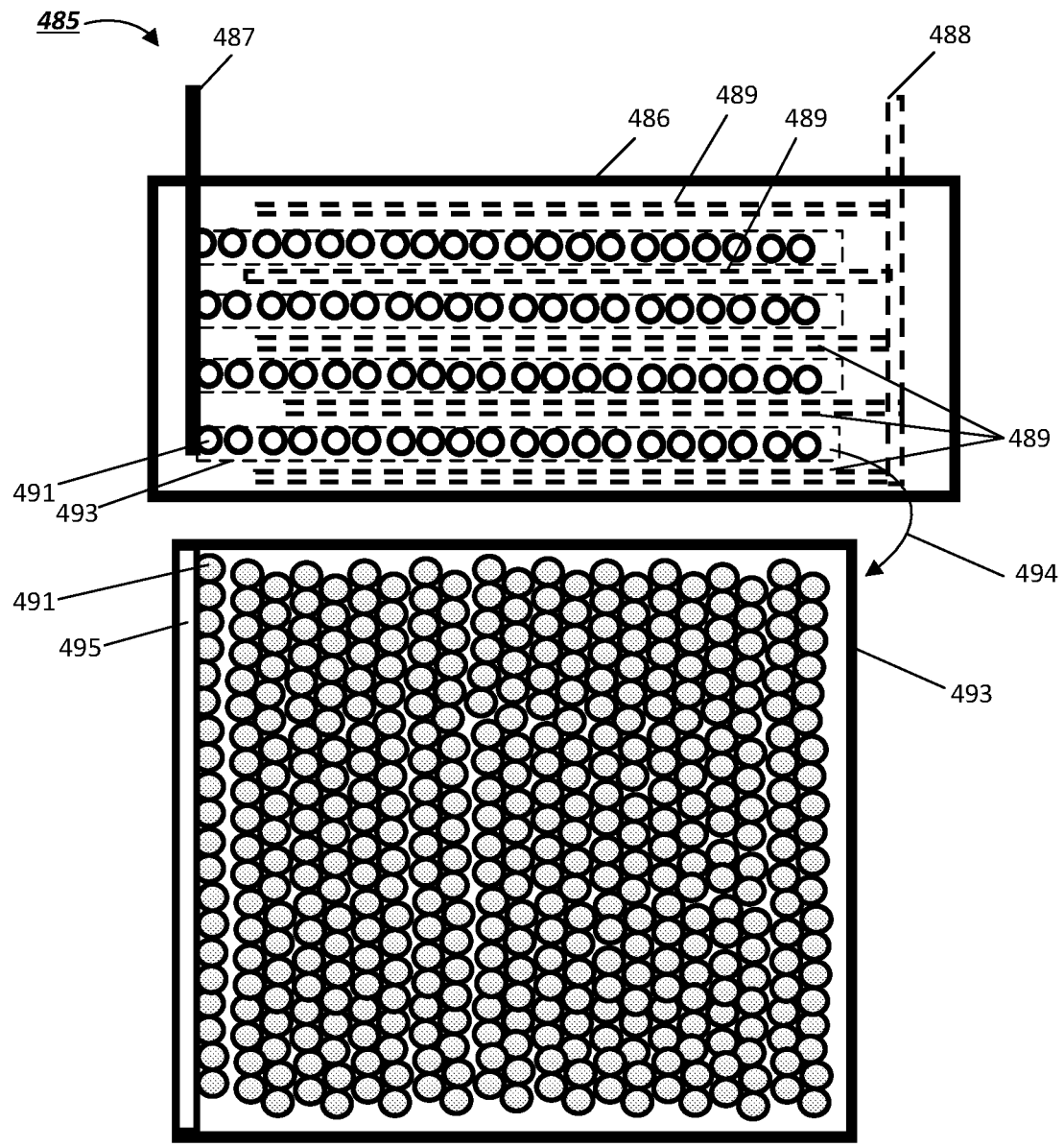
FIG. 4D is an illustrative diagram that shows an electrolysis device based on the use of metal spheres 491.

FIG. 4D shows an embodiment 485 similar to the one seen in FIG. 4C, except that it is based on the use of tin metal spheres (e.g., 491). The figure once again shows a plan view at the top of the drawing page and a side view at the bottom of the drawing page. Referring to the plan view at the top of the page, the embodiment once again has a housing 486 and first and second conductive terminals 487 and 486 to provide current to the anode and cathode components, respectively. In the depicted example, the anode is configured as a series of mesh cages 486 (i.e., conductive or non-conductive) which serve as vertical plates, each carrying a multitude of metal tin spheres (as seen at the bottom portion of the figure, where one of these vertical plates is removed and seen laid against the drawing page, as denoted by arrow 494). The mesh cage permits water to pass, and each metal sphere can have a size on the order of a centimeter to 1-2 inches in diameter. The spheres for each vertical panel are "packed-in" to the associated mesh cage, i.e., such they establish electrical contact with each other as well as with a vertically oriented conductor bar 495, which couples to terminal 487. The mesh cage for each anode "panel" permits water to flow into and out of the cage, with the tin metal spheres used to maximize surface area and thus the efficiency with which tin is transferred into the water during electrolysis. Once again, the cathode(s) can be configured as a series of vertical metal (e.g., stainless steel) plates 489 which lie in between the vertical anode panels, much as was depicted above in connection with FIG. 4B. Once again, the depicted implementation is suitable for large-flow applications and the anode panels are replaced by taking the system offline and individually removing each of the mesh cages (i.e., each as a modular panel) with a new panel.

Figure 5A:
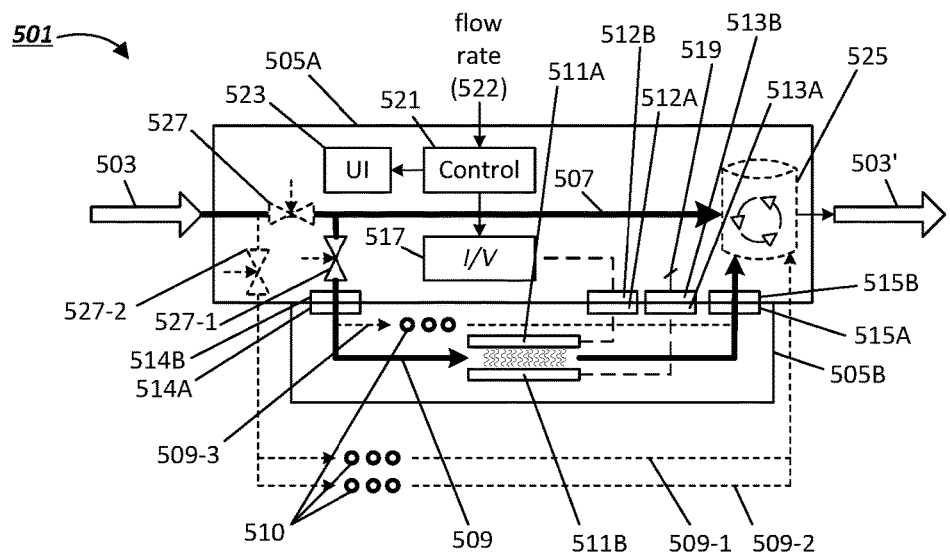
FIG. 5A is a block diagram showing parts of an electrolysis device for small scale private use (e.g., building or single-family dwelling) use; the design presented by FIG. 5A is based on a replaceable module having a tin electrode 511A.
Figure 5B:
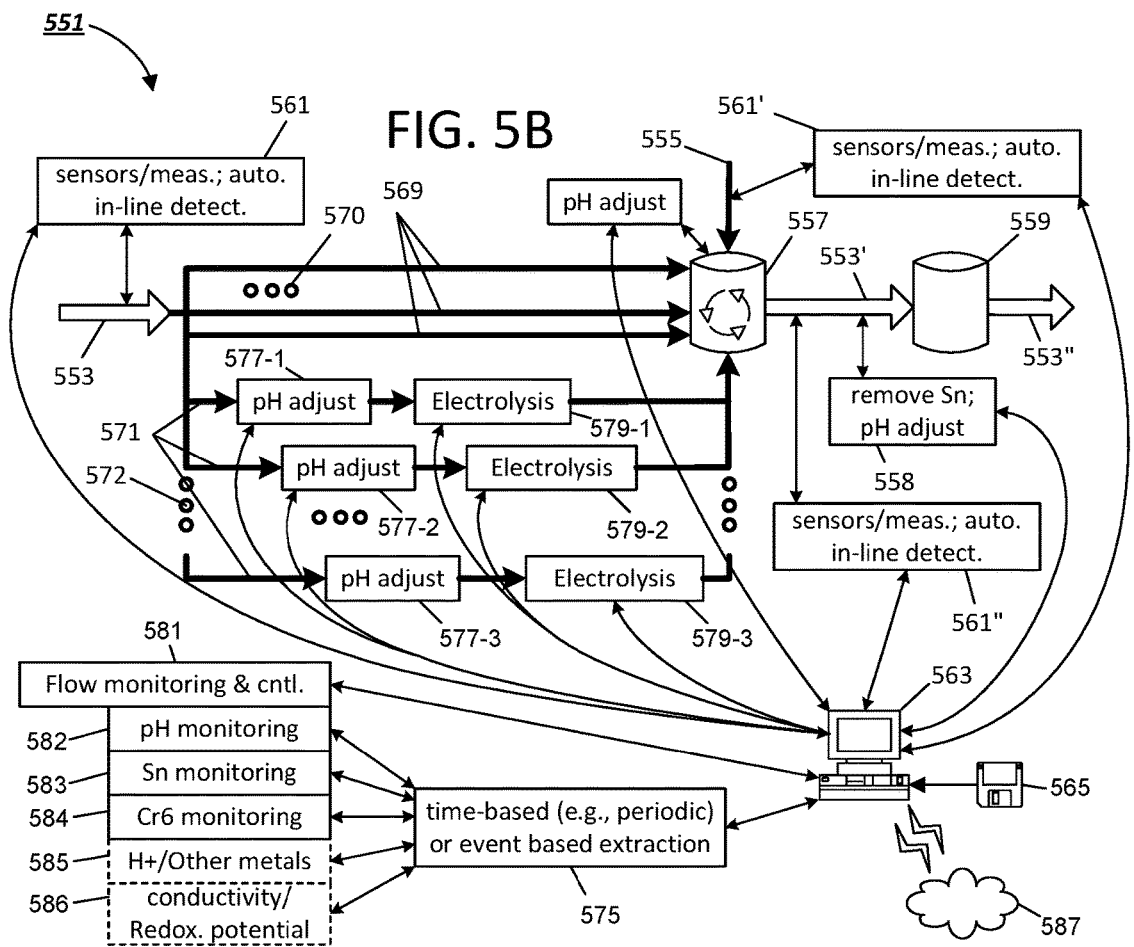
FIG. 5B is a block diagram showing parts of a commercial electrolysis system, for example, with electronic control over multiple, parallel electrolysis systems (579-1, 579-2, 579-3) which are placed on-line in response to toxic metal concentration dynamically measured in situ.

FIGS. 5A-5B show some further options for an electrolysis system. More particularly, FIG. 5A shows a modular design where a module can include two electrodes (e.g., tin anode and stainless steel cathode, or two tin electrodes that are each used as anode/cathode in an AC system, as discussed earlier); FIG. 5B shows a design that might be used for relatively large flows where multiple electrolysis systems are used in parallel (e.g., and where one or more of these systems can be switched into use or taken off-line dependent on demand).

More particularly, FIG. 5A shows one design of a small scale electrolysis system 501. In particular, numerals 503 and 503' respectively refer to the ingress and egress of the electrolysis system, which for example can be configured to be installed as a modular unit in-line with a building's water supply, or for example, to the output of a well or other water source. The modular unit includes two principal components 505A and 505B, each having its own housing. The first component 505A contains the control electronics 521, a user interface 523 (e.g., a display and/or keypad), a treatment by-pass line 507, a current and/or voltage source 517 for purposes of electrolysis, and optionally a contactor 525 (as previously described). The first component can optionally also include various sensors such as a pH sensor and flow rate sensor (not shown), as has been previously described. The second component 505B, by contrast, is a replaceable electrode module which provides for a water electrolysis treatment path 509 and which houses the anode 511A and the cathode 511B, in this case seen configured as parallel plates. The modular nature of the electrode assembly permits replacement of that assembly without affecting ability of the system to continuously deliver (untreated) water, e.g., component 505A is left inline while a replacement for component 505B is then purchased and installed. To this effect, the control electronics 521 can be used to automatically control valves 527 and 527-1, so as to shut off water to component 505B to permit its replacement, while permitting passage of water along bypass line 507. As depicted optional features, the second component 505B can feature more than one electrolysis system, and/or conversely, component 505A may provide for engagement with multiple "second components" such as component 505B; these optional additional electrolysis paths are represented by a series of ellipses 510 in the figure, and each additional path can further have an associated valve (527-2) to permit replacement without taking component 505A offline.

FIG. 5A also shows a series of reciprocal engagement structures 512A/B, 513A/B, 514A/B and 515A/B, which are respectively used to provide an electrical contact for supply of voltage and/or current to the anode from source 517, to couple the cathode 5116 to ground or another reference 519, and to provide ingress and egress for water supplied by component 505A to component 505B. Briefly, in one embodiment, the first and second modular components 505A and 505B are advantageously designed such that their engagement necessarily and inherently engages these structures on a water-tight basis (in association with electrolysis treatment path 509, 509-1, 509-2, etc.) and on an electrically conductive basis (in connection with engagement structures/electrical contacts 512A/B and 513A/B); for example, engagement structures 512A/B and 513A/B can be designed using conductive springs and clips (e.g., as is conventionally used for conventionally-sized batteries for personal applications) and engagement structures 514A/B and 515A/B can be designed to have gaskets and compression fittings, so as to provide a water-tight seal.

FIG. 5B shows an embodiment 551 that is configured for high-flow applications, e.g., commercial water distribution systems. As before, the system features an ingress path and an egress path, 553 and 553" respectively. This embodiment features multiple parallel bypass flow paths (represented by numeral 569 and associated ellipses 570) and multiple electrolysis flow paths 571. Water from a first source enters via the ingress path 553 and is then diverted to one or more of these paths, as appropriate, with treated and untreated water being mixed at contactor 557, as was the case before. Note that water from another source can also be added to contactor, as represented by an additional ingress path 555; as an example, ingress path 553 might represent water from a river or dam, while ingress path 555 might represent water from a second source, used seasonally, or vice-versa. Numerals 561, 561' and 561" represent automated, in-line measurement systems that monitor for toxic metal presence (and also detect other pertinent parameters, as previously referenced). As a non-limiting example, water from each source (i.e., arriving via path 553 and 555 respectively) may have different Cr6 levels (or other target substance levels), which are dynamically measured and used by control electronics 563 to adjust electrolysis levels (and consequently, tin-2 added by operation of the system); note that in a sophisticated system, the control electronics can once again be implemented as one or more computers (e.g., one or more processors) run under the auspices of suitable control software 565. In a high volume flow application, in response to dynamically-changing factors, the control electronics can adjust flow rates of each of paths 569 and 571, for example, adding electrolysis capacity as flow rates or detected target substance concentrations rise, and taking electrolysis offline as flow rates or detected target substance concentrations levels decrease. As higher target substance concentrations are detected in source 555, the system can divert water flow from paths 569 to paths 571 (or otherwise increase electrolysis, e.g., by increasing voltage or current for a given electrolysis system, by increasing electrolysis capacity or by decreasing the relative amount of untreated water provided via paths 569, as appropriate); other design variations will also occur to those having ordinary skill in the art. As noted by ellipses 572, there can be three or more high-capacity water electrolysis systems used in parallel; as noted by numerals 577-1/579-1, 577-2/579-2, and 577-3/579-3, each can have pH adjustment functions and electrolysis control parameters separately varied. Whichever paths are utilized, software 565 advantageously can regulate electrolysis and water flow such that sufficient tin-2 is produced so as to neutralize substantially all of the target substance of interest before water leaves the contactor 557, via path 553'. At this point, water is once again advantageously measured in real time for various substances, as desired; as denoted by numeral 558, this monitoring can include monitoring for excess tin, as previously described, with addition of chlorine or another reducing agent added so as to convert excess tin to a form where it can be easily separated from water output by the system. As represented by numeral 559, treated water from which the target substance has been removed can then be delivered to a storage tank, prior to water delivery via egress path 553".

Numerals 581-587 illustrate a number of functions and responsibilities of control electronics 563 and/or software 587. First, as noted previously, the control electronics monitor flow rate and control flow paths 569 and 571 so as to provide the right electrolysis capacity, per numeral 581. Second, the control electronics processes readings for pH, residual tin, Cr6 presence, and optionally for hydrogen gas production, other metal or target substance concentration, water conductivity and redox potential, all as represented by numerals 582-586. Once again, measurement devices specific to each of these parameters are typically used in-line for automated intermittent and/or ad hoc measurement. For example as referenced by numeral 581, a measurement device (e.g., a voltametric device, driven with suitable chemistry as introduced earlier) specific to total tin or a specific species of tin can be used inline (e.g., as part of sensors 561") to detect excess tin prior to water delivery (e.g., on a repeatable basis, every 15-30 minutes). Per numeral 575 one or more of these measurement systems can be made responsive to processor command or other automation, e.g., such measurements re obtained as a function of time (e.g., on a periodic basis) or other event driven basis. Finally, per numeral 587, the system also optionally provides LAN or Ethernet WAN capability for purposes of remote operator control and/or periodic data logging.

Figure 6:
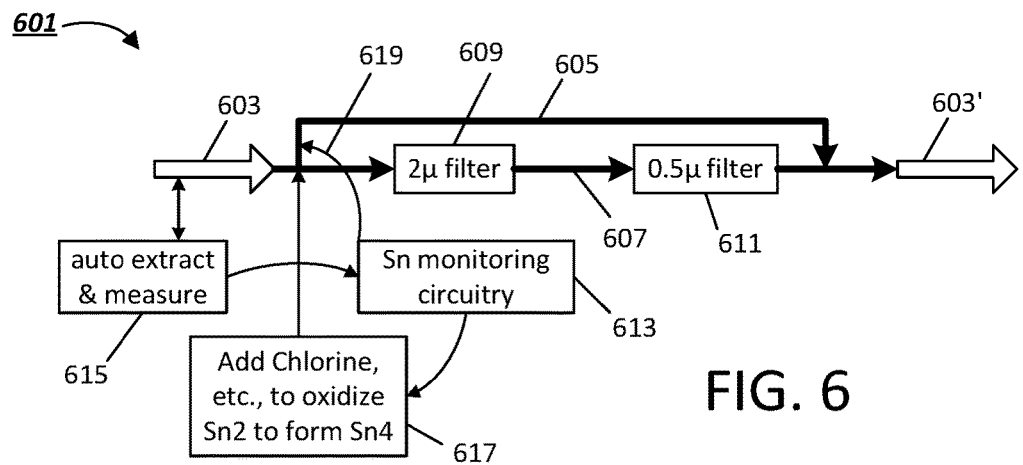
FIG. 6 is a block diagram showing optional techniques for removing excess tin from water.

FIG. 6 is used to provide more detail regarding options for monitoring for excess tin following removal (extraction) of a target substance such as a toxic metal. More particularly, FIG. 6 shows an embodiment 601 where processed water is received via path 603 and is output via path 603'. The system provides for a bypass path 605, used to directly output water if concentration of residual tin is less than a predetermined threshold, and a filtration path 607, used to filter tin-4 as particulate in the event that control electronics 613 determines that excess tin is to be removed; as before, these electronics or circuitry can optionally comprise one or more processors running suitable software. The control electronics 613 receive measurement data from and/or command measurements be performed by an in-line automated measurement unit 615, once again, which advantageously uses the system design discussed in the incorporated-by-reference PCT patent applications, referenced earlier. The control electronics 613 compares measured levels of tin to one or more thresholds, optionally for individual species of tin, and responsively controls an injection unit 617 so as to add chlorine or another substance to the water so as to further oxidize residual tin to convert it to insoluble tin-4. The control electronics 613 also controls the various flow paths, so as to control whether filtration is applied at all. Where filtration is required, the water is passed to a first (2-micron mesh) filter 609 followed by a second (0.5-micron mesh) filter 611, to remove remaining tin as particulate. The control electronics 613 advantageously monitors for filter health (e.g., using voltage/current flow analysis) to determine when one or both filters require replacement or renewal, e.g., due to excess particulate buildup. Tin monitoring/measurement is advantageously performed at a point schematically-before the 2 micron filter (i.e., as shown on FIG. 6) and after 0.5 micron filter (i.e., to measure Tin4/Cr3 precipitate accumulated in the filter).

As introduced earlier, with food grade tin in particular and the production of stannous ion in the aqueous matrix of interest, stannic oxide can build up on one or both electrodes and affect reagent generation efficiency. This is shown in part by FIG. 10, where a first curve 1003 shows the result of intermittent ultrasound cleaning of tin electrodes in terms of maintaining electrode health, while a second curve 1005 represents empirical measurements of reagent generation efficiency (i.e., stannous ion generation efficiency) over time without the use of ultrasonic cleaning. As used herein, "reagent generation efficiency" is the ratio of the actual amount of reagent generated during electrolytic process to the theoretical amount of reagent calculated according to Faraday's law. Without being bound by theory, in the case of electrolytic dissolution of a tin metal electrode, tin-4 can also be produced or formed as a secondary reaction involving tin-2 and result in a parasitic precipitate being formed on the electrode surface; this precipitate can build-up over time, and as this build-up increases, it interferes on an increasing basis with current flow and otherwise prevents tin-2 from being transferred to the aqueous matrix of interest on an increasing basis. At some point, no more tin-2 is produced due to a fully passivated tin anode and unwanted ("parasitic") reactions occur on the anode surface; this passivation process is typically followed by gradually rising voltage across the electrolysis device, which can be detected (captured) by the monitoring system. The electrolysis device used for this experimentation will be further described below in connection with FIGS. 8-10, but briefly, it was found that without the use of ultrasonic cleaning, reagent generation efficiency persists for a period of time (e.g., about ten minutes as seen in the FIG., at continuous operation), and then falls rapidly to 50% after about forty minutes, and to near zero at about ninety minutes.

To address this, embodiments that electrolyze tin electrodes can include an ultrasound cleaning system, used to maintain electrode health. As noted earlier, this cleaning system can be optionally use with other cleaning processes, including without limitation a process that involves polarity reversal and/or the occasional use of a stripper solution. FIGS. 7A and 7B are used to introduce two embodiments, one in which an ultrasound probe is immersed directly in the aqueous matrix of interest, and the other of which immerses an electrode module in an ultrasonic bath.

FIG. 7A shows a first embodiment 701; a housing 703 receives the aqueous matrix of interest (e.g., ground water), as indicated by flow arrow 705, via a liquid inlet 707. The housing forms an enclosure for the two electrodes 709 and 711 and otherwise serves to provide an electrolysis and/or reaction chamber; in this case, each electrode is made of food-grade metal tin that will be dissolve over time and that supplies electrolyzed tin-2 to the aqueous matrix within the enclosure. Again citing Cr6 removal as a sample application, the stannous ion (tin-2) causes a reaction with Cr6 to the extent present in the aqueous matrix, and results in conversion of the Cr6 to trivalent chromium (Cr3). The enclosure advantageously provides for some turbidity for the aqueous matrix, enhancing mixing of the tin-2 with the aqueous matrix and efficient removal (conversion) of the target substance (e.g., Cr6). An orifice 713 can also be used to generate back pressure that urges the aqueous matrix to keep the housing full. Under the influence of pressure, the treated-aqueous matrix then exits the enclosure, in the general direction of flow arrow 715, via an outlet 717; as it is removed from the enclosure, the aqueous matrix is drawn past a flow meter 719. The flow meter can be of a conventional design that relies on an impeller 721, which spins as liquid is pulled past it which generates a flow output signal 723 that can be used to control the amount of reagent production (i.e., as described earlier, this signal can be is passed to control electronics and used to responsively throttle reagent generation up or down). Note that other types of flow meters exist that can equivalently be used in this process. As indicated by numeral 725, the flow meter can advantageously also bundle other sensors and associated outputs, for example, a temperature sensor or pH sensor, with measured values also being provided to control electronics, for use as has been already described. FIG. 7A also shows the use of an ultrasonic probe 727 which, in this embodiment, is also immersed directly within the enclosure; when activated by an ultrasound (US) control signal 729, the ultrasonic probe transfers ultrasonic energy to the aqueous matrix in question, which in turn, delivers this ultrasonic energy to the surface of both electrodes 709 and 711. The ultrasonic energy causes the electrodes to shed insoluble precipitate which has accumulated on their surfaces, and is therefore effective to renew the electrodes' surfaces and maintain long-term electrode health, as indicated by curve 1003. That is, this form of mechanical cleaning helps facilitate even wear of the electrode surfaces until it is time for the electrodes to be replaced. FIG. 7A also shows the use of two voltage leaves (v1 an v2), 731 and 733, which are used to provide current to the electrodes 709 and 711. As note earlier, with both electrodes in this embodiment being made of food-grade metal tin, a periodic alternating anode-cathode polarity is particularly beneficial, because it increases (doubles) the tin metal load per electrolysis device; that is to say, in an embodiment where the electrodes are a consumable that are periodically replaced, they can be replaced as a module essentially half as often as embodiments with only one tin electrode. This polarity reversal also helps provide for electrode deoxidation, as referenced earlier. In the embodiment of FIG. 7A, for example, the entire enclosure 703 (and the two electrodes 709 and 711) and optionally the ultrasonic probe can be made to be a single module, such that as electrode health expires, a user simply replaces housing 703 and its constituent elements with a replacement module having like-constituent elements. Alternatively, in other embodiments, each electrode 709 and 711 can be individually replaced.

FIG. 7B shows a second embodiment 751 that similarly relies on an enclosure 753 for two tin metal electrodes 757 and 759. In this case, this enclosure is a first enclosure that lies within a second enclosure 755; an ultrasonic probe 769 is seen to be mounted within the second enclosure, but not the first, and facilitates a design where the first enclosure 753 and the tin electrodes can be exchanged for a replacement module without changing the ultrasound delivery components. The second enclosure provides an ultrasonic bath, i.e., ultrasound energy is delivered to a liquid in the interior 763 of the second enclosure 755, and is then conveyed through first enclosure 753 and via liquid in the interior 761 of the first enclosure 753 to tin electrodes 757 and 759. The two enclosures 753 and 755 can be designed so that the aqueous matrix in question fills both enclosures (e.g., when water is turned on, after installing the electrolysis device or a replacement electrode module), with an orifice 765 providing backpressure as was the case for the embodiment of FIG. 7A, discussed above. As before, during operation, the aqueous matrix in question (e.g., ground water) arrives via an inlet 771, in the general sense of flow arrow 773, it fills both enclosures and, following treatment, exits in the general sense of flow arrow 769, via outlet 775. As before, an impeller 767 of a flow rate sensor 768 measures flow rate, and provides an electronic indication of flow 783 to control electronics (not depicted din the FIG.), optionally with other sensor outputs 785 (e.g., such as pH or temperature). As before, electronic signals used to manage the electrodes can include first and second potentials, v1 and v2, provide by leads 777 and 779, and an ultrasound control signal (US), which is used to drive delivery of ultrasonic energy from the ultrasonic probe 769. In an alternative embodiment, ultrasound energy can be delivered by a contact transducer 769', which is mounted outside the second enclosure 765; this contact transducer provides ultrasound delivery to the second housing, which in turn conveys it to liquid in interior 763, once again forming an ultrasonic bath (e.g., in which a replaceable electrode module is immersed).

Figure 8:
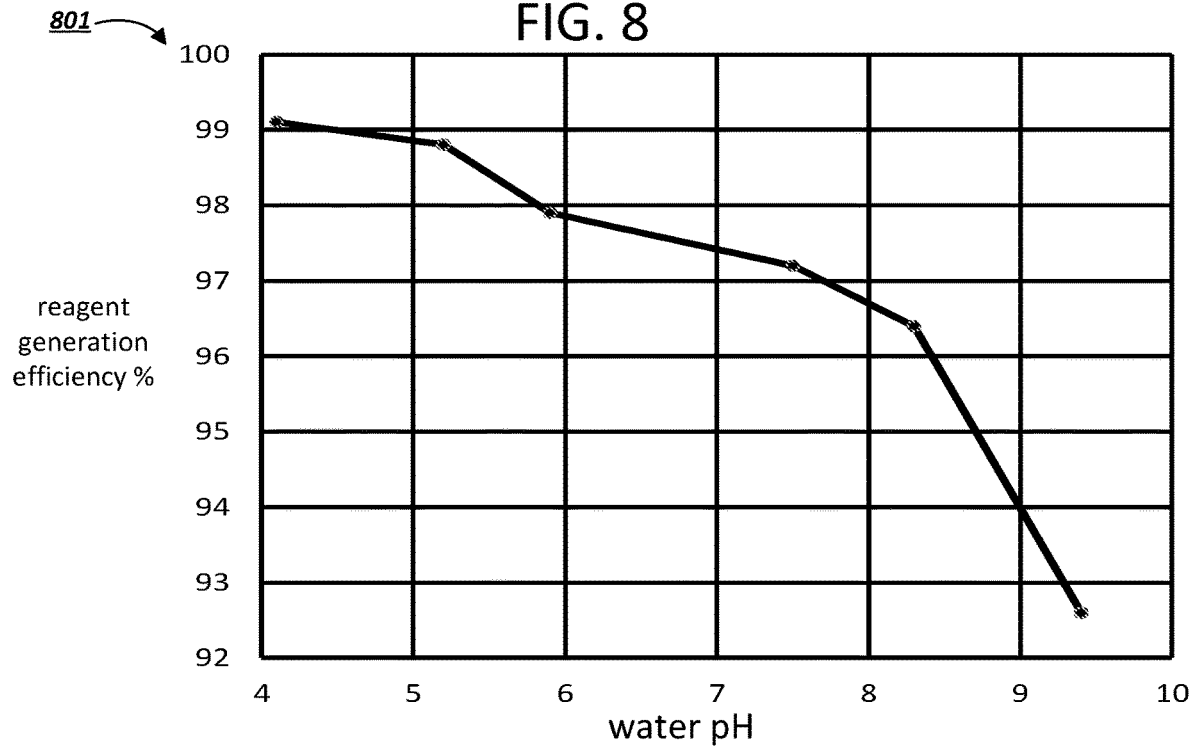
FIG. 8 is a graph showing reagent generation efficiency as a function of pH of the aqueous matrix being treated.
Figure 9:
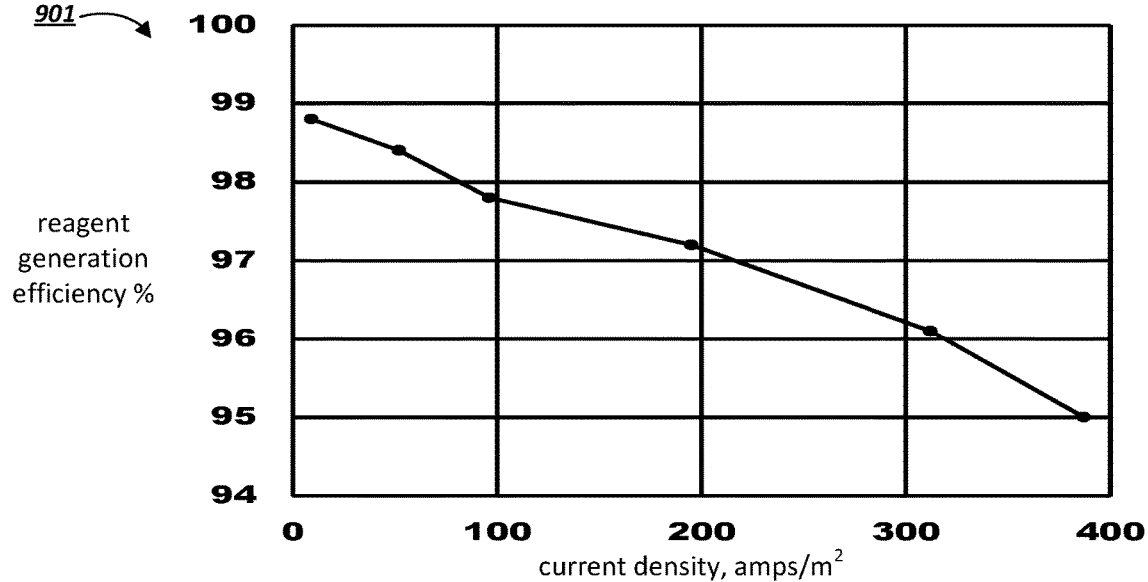
FIG. 9 is a graph showing reagent generation efficiency as a function of current density at the surface of an electrode that is to be electrolyzed, to contribute soluble material into the aqueous matrix being treated.
Figure 10:
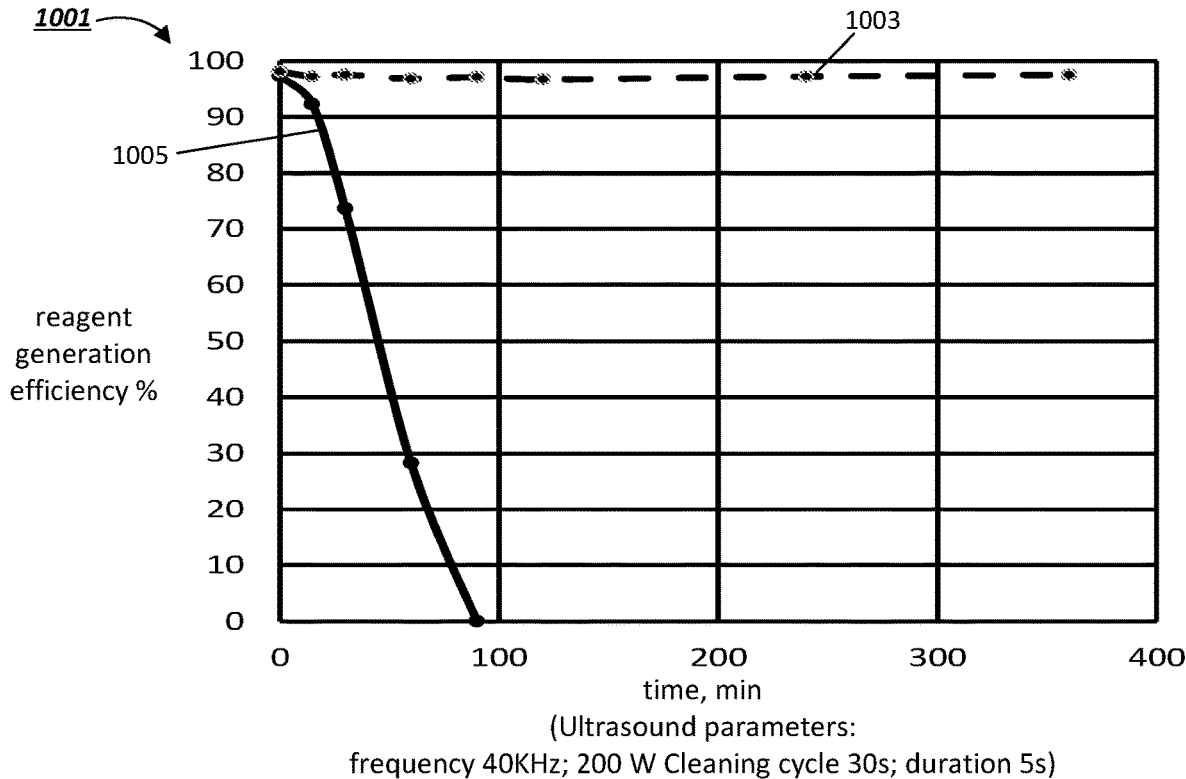
FIG. 10 is a graph showing the effects of ultrasonic cleaning on long-term electrode health.

In association with FIGS. 8-10, generation efficiency behavior as function of water pH was studied using a small scale (low flow rate) electrolysis device with a parallel plate electrode configuration, with the electrolysis device characterized by the following parameters:

- each of the anode and the cathode were made of 99.8% tin plates (0.8 cm thickness) with dimensions 3.2 cm×25 cm and surface area 0.008 m square; these electrodes were encapsulated in 30 cm long 3.7 cm ID Pyrex pipe served as electrolysis device and the distance between electrodes was 0.8 cm;
- The generation current was 1.54 A, and generated current density 195 A/m square;
- The aqueous matrix was ground water with an original pH of 7.5 for testing, with water pH being selectively adjusted to other pH values using selective addition of concentrated HCl and KOH respectively; and
- To model water delivery, a peristaltic pump with flow rate 2.0 l/min was used to generate a flow.

Reagent generation efficiency with tin-2 as the reagent of interest was calculated gravimetrically, again, by calculating the ratio between actual tin anode weight loss vs theoretical weight loss according to Faraday's law. The correlation between tin-2 generation efficiency and water pH is shown in FIG. 8 and is represented by numeral 801. As seen in the FIG., reagent generation efficiency gradually decreased from near 99% as a function of increasing water pH; this is apparently due to an increased rate of a tin-4 parasitic reaction. As can be seen in the FIG., the most efficient reagent generation occurred when the water was most acidic (i.e., with pH of between 4 and 5); however, it is noted that very high levels of reagent generation efficiency (i.e., approximately 97% and above) were still demonstrated for a pH range of between 7 and 8. This corresponds to the original pH of the water use for experimentation (and it also corresponds to a typical pH delivered by municipal water supplies). As seen in the FIG., reagent generation efficiency started to fall dramatically with a pH above about 8.3, with values of below 90% expected for a pH of 10 or higher. An optimal pH for reagent generation of between 4 and about 9 can be inferred from the depicted data. Note that for a small-scale water distribution network, the difference between reasonable reagent generation efficiency (e.g., 80% or better) and high reagent generation efficiency (e.g., above about 90%) may be insignificant; however, for a large-scale water distribution network (e.g., a municipal water supply), this difference in efficiency can directly translate to difference in operating costs, and for this reason, embodiments designed for large-scale water distribution will tend to feature pH monitoring and selective addition of pH adjustment mechanisms as needed, based on automated pH monitoring and appropriate feedback control over pH adjustment, in a manner driven by operating cost minimization.

Correlation (901) between reagent generation efficiency and generation current density under a fixed water pH 7.5 is shown in FIG. 9. As seen in this FIG., the highest generation efficiencies were obtained with current densities between 10 and 200 amps per square meter ($A/m^2$), i.e., once again yielding reagent generation efficiency above 97%. Further increase in current densities results in generation efficiency reduction to 95% for current densities of between 200-400 $A/m^2$. It is believed that tin-4 formation during tin anode dissolution is not only source of reagent loss; generated tin-2 reagent already present in water flowing through the electrolysis device can be further oxidized on the anode surface into insoluble stannic oxide ($SnO_2$). This insoluble compound precipitates onto anode surface causing electrode passivation, which in turn results in significant voltage increase across electrolysis device. This accumulation was referred to above and is a reason why ultrasound (and/or other) cleaning processes are used in some embodiments to remove precipitate. For other treatment chemistries (e.g., to remove a target substance other than Cr6), and/or using a reagent based on a metal other than tin, the considerations may be different, and no cleaning process (or other cleaning processes) may be used as a function of the pertinent chemistry. Based on the data represented by FIG. 9, it is believed that large-scale water distribution networks will wish to regulate current density in a manner that maximizes reagent generation efficiency and in a manner that results in "just enough" reagent being generated to convert and/or neutralize a target substance of interest; once again, control electronics in embodiments geared to these large-scale implementations can employ voltametric measurement systems to measure presence of the target system, and responsively control both voltage and current density so as to produce the proper amount of reagent needed with the lowest current density capable of producing this reagent, once again, in a manner so as to minimize operating costs. As referenced earlier, control electronics, and associated firmware, are advantageously designed so as to perform these calculations automatically (e.g., based on automated, intermittent or periodic sample extraction for the target substance of interest, either upstream, or utilizing feedback, and responsive automated control over reagent generation parameters, as was discussed above in relation to FIG. 3C).

As discussed just above, the effect of anode passivation is that the anode starts to become covered by an insoluble grey precipitate (which is easily noticed, as a suitable anode surface is shiny, with well-defined tin crystals on its surface). Without electrode regeneration, the precipitate can build up on an increasing basis, and reagent generation efficiency is seen to drop; such a "poisoned" (passivated) tin anode can eventually become incapable of generating tin-2 reagent. In experimentation, high tin reagent generation rates resulted in higher instant tin-2 concentrations, but tended to cause faster anode passivation and failure.

As noted earlier, depassivation can be achieved by means of some specific cleaning processes; these can include, without limitation, chemical depassivation, with the help of some chemical elements; hydrodynamic depassivation, with forced circulation of the fluid (treated water); mechanical depassivation, by the action of an abrasive tool upon the passivate film; electric depassivation, by periodically changing the polarity of the applied voltage; and ultrasonic depassivation as referenced earlier. Contemplated embodiments, again, where tin-2 is the reagent of interest, can use any combination of these depassivation processes, including without limitation the use of ultrasonic depassivation as was illustrated by the embodiments of FIGS. 7A-7B. Each of these cleaning processes is contemplated for use with the techniques described herein, depending on embodiment, but each involves certain tradeoffs and limitations. Chemical depassivation using strong complexing agent (oxalic acid) can be effective; however, this approach requires process interruption and additional hardware, and it generates waste (in the form of spent acid) that must be collected and disposed of. Mechanical depassivation also requires interruption, is time consuming and is labor intensive. Both hydrodynamic and electric depassivation were generally observe ineffective in case of tin anodes (although these processes can potentially be used where electrodes are made from other materials, i.e., where different treatment chemistries are involved). In connection with the embodiments of FIGS. 7A-7B, as seen above, application of ultrasound as a variant of mechanical scrubbing (cleaning) was effectively implemented for in situ tin anode depassivation in a fully automated manner. More particularly, ultrasound frequencies in the range of about 20 KHz to 60 KHz, with an with applied power ranging from 100 watt (W) to 1000 W was found highly efficient for tin anode depassivation in different configurations of electrolytic devices. The effects of tin anode depassivation using ultrasonic cleaning, and consequent improvements in long term tin-2 generation efficiency, are demonstrated by FIG. 10; In this FIG, a first curve 1003 shows long-term reagent generation efficiency with ultrasonic cleaning, and a second curve 1005 shows long-term reagent generation efficiency without the use of any cleaning process. As can be seen from the FIG., without cleaning, significant reduction in tin-2 generation efficiency was observed after only about thirty minutes of electrolysis. However, with ultrasonic cleaning (i.e., 200 W applied power, with a five second ultrasound application ever thirty seconds), no change in reagent generation efficiency was observed after six hours of continuous operation. The data shown in FIG. 10 suggests a conclusion that for electrolysis devices that use tin-electrodes, some type of cleaning can be applied at least every ten minutes (assuming continuous operation), if not more frequently, to maintain high levels of electrode efficiency; the duty cycle for ultrasonic cleaning (i.e., ratio of ultrasound duration to operating time) should be high enough, given the amount of applied ultrasonic power) should be high enough so as to stably maintain reagent generation efficiency above about ninety percent. As this statement implies, where more power can be used for ultrasonic cleaning (i.e., where the effects of cleaning are stronger/more efficient), the duty cycle can be smaller, but where only modest power ultrasound is available, the duty cycle can be made somewhat larger. For a small-scale electrolysis device using modest ultrasound power, a duty cycle of 6:1 was found effective (i.e., FIG. 10 represents ultrasound frequency of 40 kHz, cleaning cycle every thirty seconds, with ultrasound application for five seconds). Note that control electronics once again can be configured to monitor electrolysis operation and/or other parameters and automatically invoke and/or control cleaning. For example, it was mentioned above that stannic oxide builds up as a function of levels of electrolysis; the firmware used as part of the control electronics to manage cleaning in one embodiment advantageously adjusts either how frequently ultrasound is used, or the duty cycle ratio (e.g., from 6:1 to some other value), or both, in dependence on how aggressively electrolysis is being used to generate reagent. For example, if, e.g., Cr6 levels are high, and electrolysis is being used aggressively to treat these high levels, then more ultrasound energy is delivered in a given time period (e.g., the cleaning cycle can be run more frequently than "every thirty seconds," or the duty cycle for ultrasound production can be increased from five of every thirty seconds to ten of every thirty seconds; also in some embodiments, applied power can be increased (e.g., from 200 W to 400 W) or ultrasound intensity can be throttled up or down in response to applied electrolysis levels). In some embodiments, therefore, the control electronics measures (integrates) the amount of electrolysis applied, and dynamically initiates a cleaning cycle when a threshold has been reached; the threshold can also optionally be varied depending on other measured or predicted factors (e.g., water temperature, pH, presence of minerals, etc.).

Figure 11:
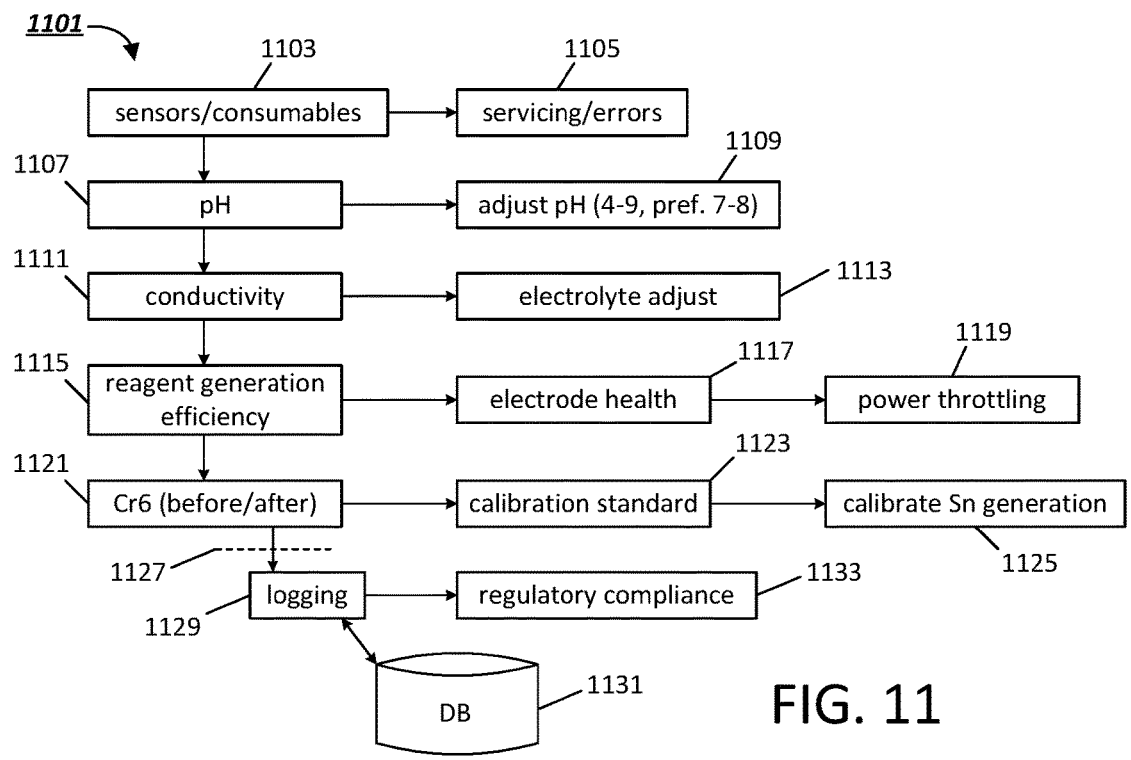
FIG. 11 is a block diagram showing calibration and maintenance functions used for one embodiment of an electrolysis device.

FIG. 11 provides a diagram 1101 showing some optional features associated with electrolysis techniques described herein, particularly calibration, logging and reporting processes that can be performed by control electronics. As indicated by numeral 1103, an electrolysis device can include various electronic sensors and also consumables (i.e., one or more electrodes that are to be dissolved over time and which are to be periodically replaced). The sensors measure parameters associated with health and operation of the electrolysis device (e.g., electrode health in particular), as well as parameters associate with electrolysis (for example, optionally including water conductivity, flow rate, temperature, pH, target substance concentration, and/or other parameters, as referenced earlier). Control electronics receiving outputs from these sensors monitor measured parameters to detect the occurrence of errors and the need for servicing, per numeral 1105. For example, the control electronics (e.g., including appropriate firmware running on one or more processors) can generate a reminder or alert based on remaining electrode expected life, or can signal an operator or owner when it is time to replace the electrodes (e.g., on a modular basis as described earlier); the control electronics can also optionally vary control over the electrolysis in dependence on water flow, conductivity, temperature, pH, Cr6 presence and/or any other desired factors. Errors can be generated, for example, informing the operator or owner if the sensors are faulty or if out-of-bounds parameter levels are detected (e.g., if the particular implementation measures Cr6 actually present in the water and if measured levels given correction capabilities of the electrolysis system will still exceed safe levels). In a large-scale application, these signals can also cause an operator or automatic system to switch water sources, or to invoke greater or fewer water treatment processes (e.g., additional electrolysis systems can be automatically brought into service). FIG. 11 represents a number of these processes; for example, per numeral 1107, pH of the water can be measured, with the pH being adjusted through automated adjustment 1109 so as to be between 4 and 9, and preferably between 7 and 8 (e.g., for potable delivery). Per numeral

1111, water conductivity can be measured, with electrolyte (e.g., a weak KCl solution) added 1113 to an aqueous matrix of interest so as to enhance reagent generation efficiency. Per numeral 1115, reagent generation efficiency can be monitored based on reagent needed, the current density which was applied, and other factors, and can be used to infer electrode health/remaining life 1117 and/or also to adjust power 1119 so as to minimize power consumption given the amount or reagent needed. Per numeral 1121, a target substance (e.g., such as Cr6) can be measured (e.g., using a voltametric system) and used to calibrate and/or assess system performance. For example, a calibration standard 1123 can be automatically added (e.g., as part of a "spike test") with the level of electrolysis being automatically calibrated so as to ascertain 1125 how much reagent should be added to reduce the target substance to below threshold levels. Per numeral 1129, the electrolysis device can itself log data including periodic measurements of the target substance and/or the results of calibration/self-assessment, and/or it can report this to a local or remote database 1131 (e.g., via a wide area network, such as the Internet), with this data then being maintained for audit to verify regulatory compliance 1133.

FIGS. 12A-13C are used to illustrate principles associated with use of electrolysis (and more specifically, embodiments describe above) as applied to removal of mercury and selenium from an aqueous matrix of interest. Each of the features of the embodiments describe above are contemplated for use in removal of mercury, selenium and other target substances from the aqueous matrix of interest, in any combination, e.g., each of these features of the embodiments may be mixed and matched and are to be considered optional in any particular implementation, and each optionally features one or more of the cleaning processes (e.g., ultrasonic) and associated mechanisms described earlier (see, e.g., the discussion relating to FIGS. 7A-B). Without limiting the foregoing, any embodiment describe above may be applied instead to removal of mercury, selenium or another toxic metal alone, in a manner that is daisy-chained with another removal or treatment process, or in a manner where a combination of materials (e.g., Cr6 and/or $Hg^{2+}$ and/or $Se^{4+}$) are removed simultaneously using a single common electrolysis unit, or otherwise using multiple electrolysis systems with one or more shared components.

As noted earlier, Cr6 is a naturally occurring substance often present in earth and rock formations; it can therefore be naturally present in aqueous matrices, such as water supplies, and it can also potentially be released into water supplies at elevated levels as the result of human activities, such as farming, construction or mining. The same is true for mercury and selenium and other toxic metals. These materials can also be present in waste water, for example, as part of a flue gas treatment or scrubbing process. It is therefore desired to regulate the concentration of any one or more of these target substances so as to not exceed reasonably safe levels; in some applications, treated waste water once processed to safe levels, can be released into the environment and/or recycled for various applications.

As was the case for Cr6 removal, conventional techniques for removing mercury and selenite based on their precipitation are generally expensive, time consuming and require variety of toxic or dangerous substances (e.g., very concentrated acids, bases, coagulants etc.) that create transport, storage, handling and waste disposal issues. Additionally, the conventional use of multiple reagents can impact further wastewater treatment steps. The techniques described herein based on electrolytically-generated stannous ion are fast, effective and do not require extensive chemicals use. Online electrolytically-generated stannous regent rapidly converts dissolved mercury and/or selenium into elemental form. Elemental mercury is insoluble in water can be easily purged by air safely trapped and removed, while soluble selenite can be can be rapidly converted by stannous reagent into insoluble forms and precipitated. Another advantage of selenite removal (reduction to elemental selenium form) using stannous ion produced according to the techniques described herein is that precipitated selenium can be refined (harvested) from the solution and reused.

Figure 12A:
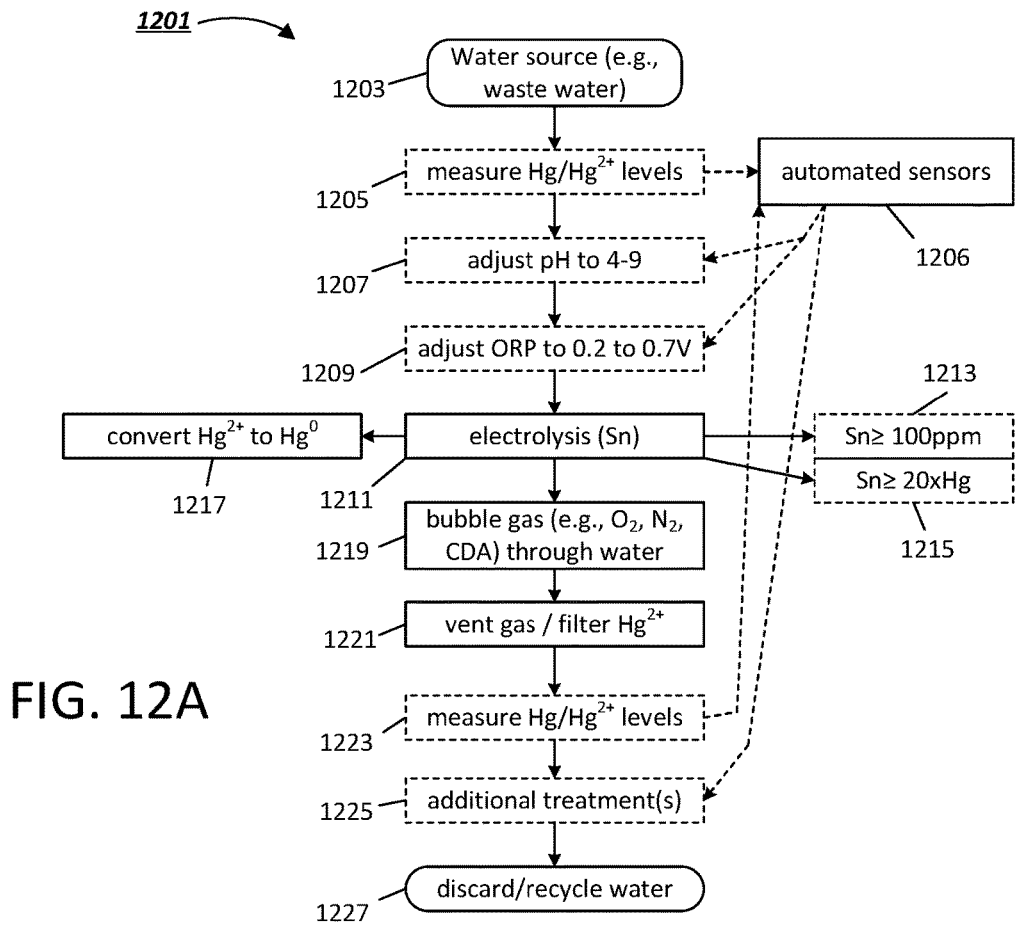
FIG. 12A is a flow chart associated with a process for removing mercury from water.

FIG. 12A is used to introduce these principles 1201 as applied removal of mercury as a target substance. It is generally desired to treat water from a water source 1203, which in an illustrative case, can be waste water produced as a result of flue gas treatment or otherwise produced as a result of human activities. Per numerals 1205 and 1206, levels of mercury (Hg) are automatically measured at regular intervals under the auspices of computer software, which causes a voltametric measurement system to draw samples, measure concentrations, and perform (ultrasonic and/or other) cleaning and renewal processes so as to prepare the voltametric measurement system for an ensuing measurement cycle. It is noted that soluble mercury ($HgCl_2$) and be processed using tin electrolysis which converts the soluble mercury to an insoluble (volatile) form ($Hg^0$) under the proper reaction conditions, namely, a stoichiometric ratio of 1:1, or preferably, a ration that provides some stannous excess. Mercury reduction in particular is less pH sensitive than other toxic metals, although in some applications, to facilitate tin-2 production, pH can be optionally regulated to lie within a range of roughly 4-9. Generally speaking, metal tin (tin-2) is added to the water using electrolysis (1211) and immediately reacts with the soluble mercury according to the following equations:

$$HgCl_2 + Sn^{2+} = Hg^{2+} + 2Cl^- + Sn^{2+} \qquad (1); \text{ and}$$

$$Hg^{2+} + Sn^{2+} = Hg^0 + Sn^{4+} \qquad (2)$$

with tin-4 being precipitated from the water as described earlier. To facilitate almost instantaneous reaction in the aqueous matrix of interest, as indicated by optional process blocks 1213 and 1215, in one embodiment, the level of tin electrolysis is driven so as to produce a relatively large amount of tin (e.g., ≥100 ppm) and in another embodiment, the level of tin electrolysis is driven so as to produce a large amount of tin relative to mercury actually present in the water (e.g., such that Sn≥10 times the amount of mercury, preferably 20 times the amount of mercury). The reaction converts the mercury to a volatile form (1217), and this volatile mercury ($Hg^0$) is readily extracted from the water by bubbling air (e.g., oxygen gas, nitrogen gas, or clean dry air) through the treated water and collecting vented gas (i.e., per numeral 1219). As indicated by numeral 1221, gas bubbled through the treated water can be vented and filtered (for example, using a charcoal filter or similar process) to trap volatile mercury, with the filter occasionally being changed or renewed via a periodic maintenance process. Note that the amount of gas supplied to the water to remove volatile mercury can be regulated such that all volatile mercury is removed almost instantaneously (i.e., in less than 1-2 minutes). For example, per numeral 1223, it is possible to measure remaining mercury levels downstream and to increase the level of electrolysis, gas supply or both, so as to drive residual mercury down to desired levels. As indicated by numerals 1225 and 1227, the treated water can then be subjected to additional processing (e.g., to remove or scrub other substances), and can then be discarded or recycled as appropriate.

Figure 12B:
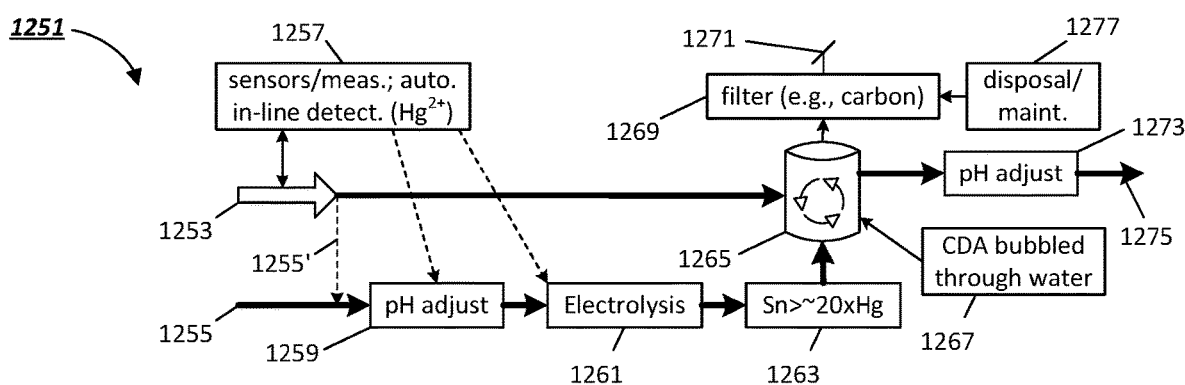
FIG. 12B is an illustrative diagram showing components of a system for removing mercury from water.

FIG. 12B provides an illustrative diagram 1251 of a system for performing the tasks described in reference to FIG. 12A. Water enters the system through an inlet 1253 and is tested by sensors/in-line detection systems 1257 to determine the amount of mercury present. For example, a control system (as described earlier) can receive measurement information, compute mercury levels present, and can responsively control system parameters such as pH (1259) and electrolysis parameters 1261 (i.e., so as to regulate tin-2 generation) so as to reduce mercury concentration to desired levels. Per numerals 1255 and 1255', the electrolysis can be applied to water from a second source (1255) or alternatively can be applied to a stream of water diverted from inlet 1255. As noted above (and as indicated by numeral 1263), in one implementation, the electrolysis is regulated so that tin-2 is produced in a 20-to-1 ratio relative to mercury present in the water. The water is then supplied to a contactor 1265, where it is circulated with water from inlet 1253 in order to permit conversion of mercury to volatile form as described above. A gas source 1267 is then used to bubble gas through the treated water to accelerate the evaporation of volatile mercury, with the gas then being collected and filtered (1269) prior to gas venting (1271). Once again, the filter can be a charcoal filter (or any other filter suitable for extracting the volatile mercury), and is periodically replaced or renewed as part of periodic maintenance 1277. The pH of the treated water can then be optionally adjusted as necessary, as indicated by numeral 1273, prior to water recycling or disposal 1275.

Figure 13A:
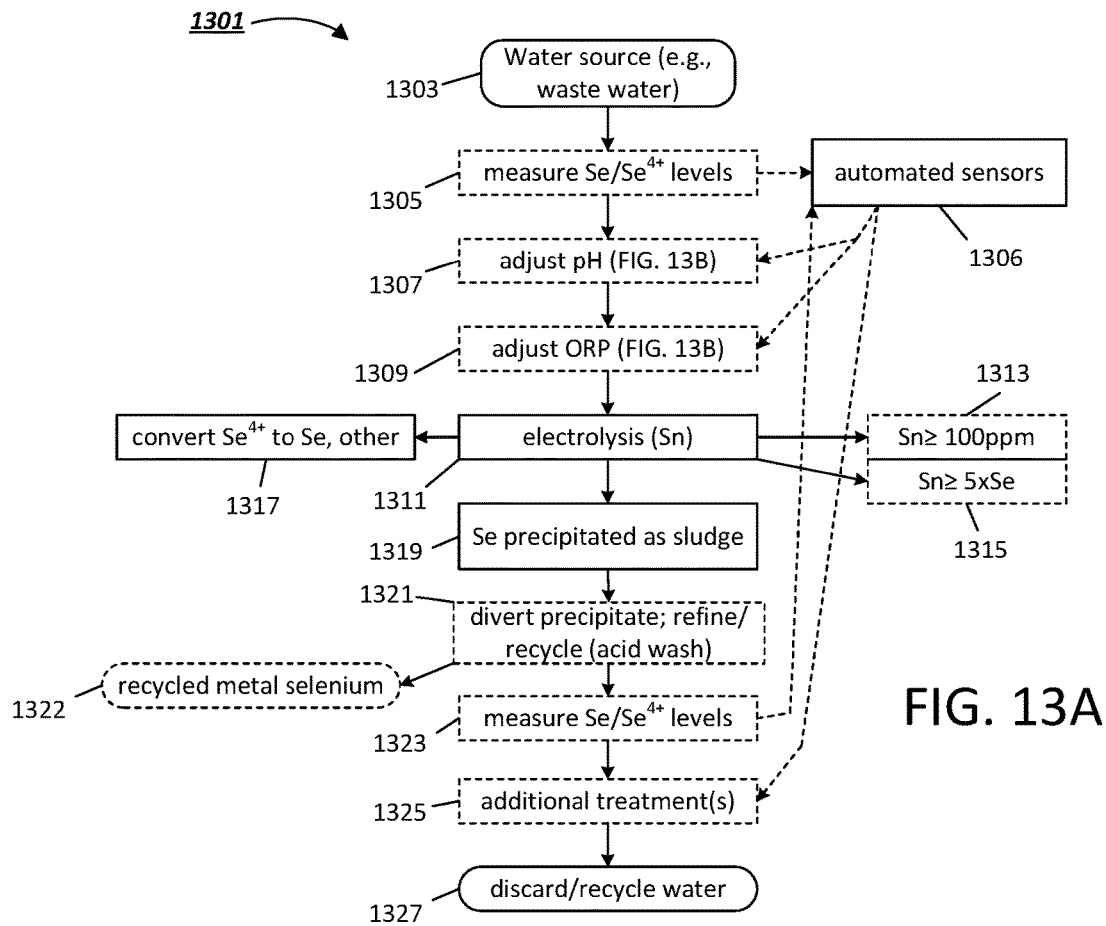
FIG. 13A is a flow chart associated with a process for removing selenium from water, and for optionally recycling (i.e., recovering, refining or harvesting) metal selenium.

FIG. 13A provides a flow diagram similar to the one seen in FIG. 12A, but this time illustrating principles associated with the removal of selenium as a target substance. It is generally desired to treat water from a water source 1303, which once again can optionally be waste water produced as a result of flue gas treatment or otherwise produced as a result of human activities. Per numerals 1305 and 1306, levels of selenium (Se, $Se^{4+}$, or any desired species or forms of selenium) are automatically measured at regular intervals under the auspices of computer software, which causes a voltametric measurement system to draw samples, measure concentrations, and perform cleaning and renewal processes so as to prepare the voltametric measurement system for an ensuing measurement cycle; see once again generally WO/2018013293 (and its US counterpart, which have been incorporated by reference). Soluble forms of selenium can also be processed using tin electrolysis which converts the soluble selenium to an insoluble form under the proper reaction conditions, namely, an acidic environment with a suitably controlled oxidizing-reducing potential. Generally speaking, metal tin (tin-2) is added to the water using electrolysis (1311) and immediately reacts with the soluble selenium according to the following equation:

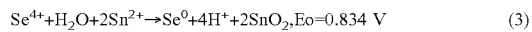

$$Se^{4+}+H_2O+2Sn^{2+} \rightarrow Se^0+4H^++2SnO_2, Eo=0.834 \text{ V} \quad (3)$$

with stannic oxide and metal selenium (or other forms of selenium) being precipitated from the water as described earlier. Generally speaking, the form of insoluble selenium produced from this reaction can depend heavily on the pH of the reaction environment and the applied electric field, as illustrate in FIG. 13B. Thus, in one embodiment, and as optionally indicated by function blocks 1307 and 1309, pH of the reaction environment and applied electric field can be tailored so as to produce the desired form of precipitated selenium. As an example, to produce metal selenium as a direct reaction by-product, in one embodiment, pH and ORP (oxidation-reduction potential) can be regulated relative to one another so as to deliberately and specifically produce Se and $SnO_2$ as the reaction by-products, as indicated by a central region of FIG. 13B (e.g., with the oxidizing-reducing potential held to between 0.4 and 0.6 volts at a pH of less than about 2.0). As indicated by the FIG., other forms of selenium can be produced including without limitation $HSeO_4$, $H_2SeO_3$, $SnSe_2$, $SnSe$, $HSe$, and $H_2Se$, depending on process controls. To facilitate almost instantaneous reaction in the aqueous matrix of interest, the pH is advantageously lowered to less than about 2.5 and the level of tin electrolysis is driven so as to produce a large amount of tin relative to selenium actually present in the water (e.g., preferably times the amount of selenium), again, so as to facilitate a near instantaneous reaction. The reaction converts the selenium to an insoluble form (1317), with the selenium then being precipitated from the water as an insoluble sludge (i.e., per numeral 1319). As indicated by numeral 1321, the insoluble precipitate can be diverted from the treated water and separated (optionally for recycling/harvesting of selenium, as indicated by numeral 1322). In one embodiment, as indicate by function block 1321, the selenium sludge can be processed using an acid wash to remove other precipitates and thereby "purify" the extracted selenium. Per numeral 1323, it is possible to measure remaining selenium levels downstream and to throttle the level of electrolysis so as to drive residual selenium down to desired levels. Per numerals 1325 and 1327, the treated water can then be subjected to additional processing (e.g., to remove or scrub other substances), and can then be discarded or recycled as appropriate.

Figure 13C:
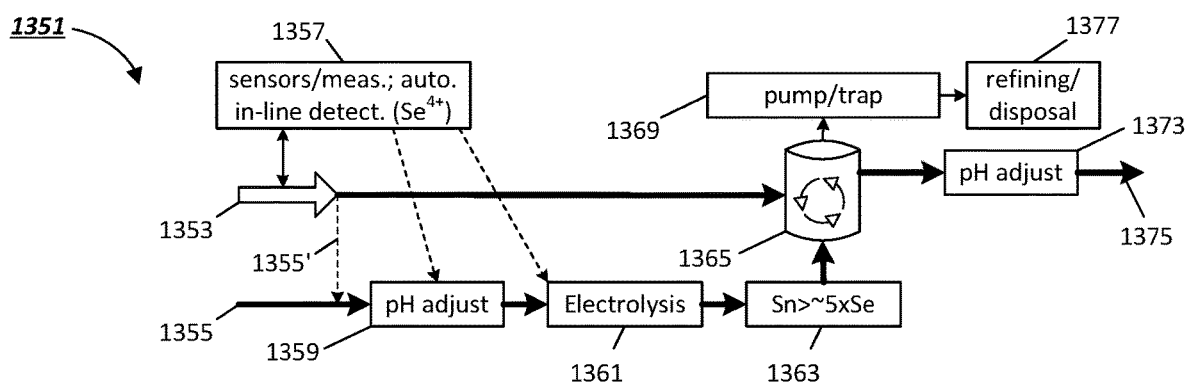
FIG. 13C is an illustrative diagram showing components of a system for removing selenium from water, and for optionally recycling (harvesting) metal selenium.
Figure 13B:
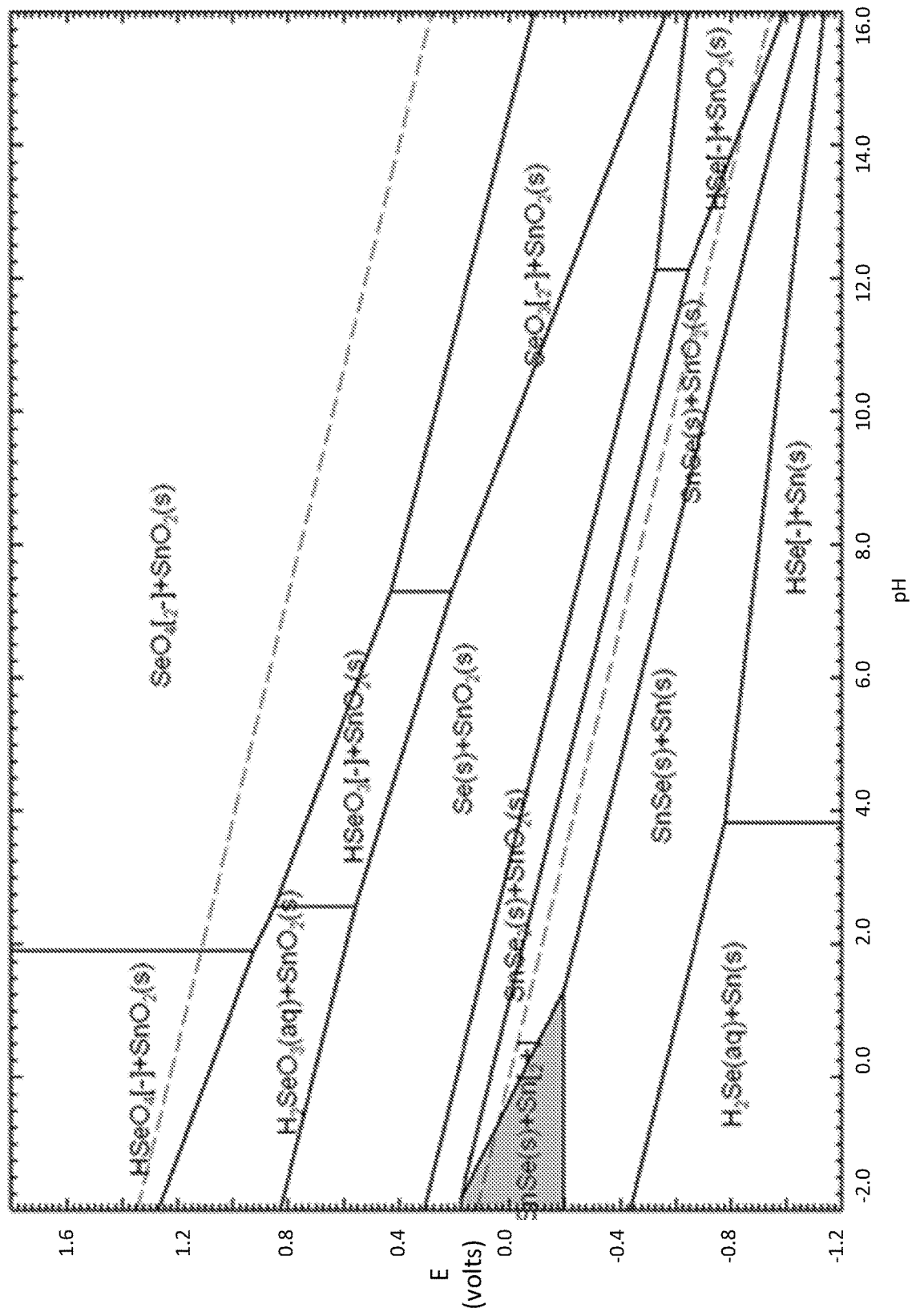
FIG. 13B is a graph showing reaction by products of selenium-4 ($Se^{4+}$) as a function of pH and the applied electric field.

FIG. 13C illustrates a system suited to performing the various tasks indicated in FIG. 13A. Water enters the system through an inlet 1353 and is tested by sensors/in-line detection systems 1357 to determine the amount of selenium present. For example, a control system (as described earlier) can receive measurement information, compute selenium levels present (i.e., for one or more distinct species of selenium), and can responsively control system parameters such as pH (1359) and electrolysis parameters 1361 (i.e., so as to regulate tin-2 generation) so as to reduce selenium concentration to desired levels. Per numerals 1355 and 1355', the electrolysis can be applied to water from a second source (1355) or, alternatively, can be applied to a stream of water diverted from inlet 1355. As noted above (and as indicated by numeral 1363), in one implementation, the electrolysis is regulated so that tin-2 is produced in a 5-to-1 ratio relative to selenium present in the water. The water is then supplied to a contactor 1365, where it is circulated with water from inlet 1353 in order to permit conversion of selenium present in the water to one or more insoluble forms, as described above. As indicated by numeral 1369, the insoluble selenium is precipitated to the bottom of a tank (or into a trap), and is pumped out of or otherwise separate from treated water in the tank for refining and/or disposal (i.e., per numeral 1377). The pH of the treated water can then be optionally adjusted as necessary, as indicated by numeral 1373, prior to water recycling or disposal 1375.

Reflecting on the various systems and methods described above, what has been described are systems, methods, devices, designs and techniques for providing toxic metal removal and corrosion inhibition using electrolysis, to transfer metal from an electrode into a water supply. The described techniques provide an effective mechanism for treating very low levels of metal residuals; for example, metal Cr6, Hg and Se present in even low ranges (e.g., ppm or even lower concentrations) can be effectively treated/reduced to levels under 5-10 ppb and 5 ppb; the described processes are suitable for both continuous flow and batch operation, and provide a near instantaneous treatment/reaction mechanism. In some embodiments, an electrolysis device can be used as part of a distribution network where an aqueous matrix of interest (optionally water) is treated and then distributed. In some embodiments, such an electrolysis device can be used to treat a target substance (e.g., a harmful material) to convert it to a safe form or otherwise neutralize it or remove it from the aqueous matrix of interest. In still other embodiments, such an electrolysis device is used where there is no such target substance, e.g., the electrolysis device is used in a "closed" system such as a cooling system simply for purposes of corrosion inhibition (e.g., neutralization of corrosive agents and/or biofilms as referenced herein).

The described systems are amendable to automated, field use, and provide for a less expensive, safer treatment process than conventional methods, in a manner amendable to both large and small scale usage. Note that while potable water is used as one principal application, the disclosed techniques are not so limited and can also be applied to "dirty" water samples, or to other liquids (e.g., cooling fluid in a recirculatory system). Also, if applied to target substance neutralization, the principles described herein can be applied to the removal or reduction of materials other than Cr6, Se and/or Hg; in other embodiments for example, electrolysis can be used to neutralize or remove materials such as cadmium, lead, copper, arsenic, chromium, beryllium, aluminum, nickel, uranium, zinc, and to other metals and non-metallic substances. In some embodiments, electrolysis uses electrodes other than tin (e.g., another metal as suitable to the particular chemistry of the treatment process of interest). As should be apparent, therefore, the present disclosure provides for substantial advances, not only in water safety, but also in terms of compliance and accountability, potentially changing the way in which water suppliers and regulatory authorities conduct business.

Various alternatives to the foregoing techniques will readily occur to those having skill in the art. To pick just a few examples, techniques mentioned above may be applied using other types of applications, chemistries, reagents, analytes or processes. Many other variations also exist. Accordingly, the foregoing discussion is intended to be illustrative only; other designs, uses, alternatives, modifications and improvements will also occur to those having skill in the art which are nonetheless within the spirit and scope of the present disclosure, which is limited and defined only by the following claims and equivalents thereto.

We claim:

1. An apparatus for removing a target metal from an aqueous matrix, the apparatus comprising
   an inlet;
   a chamber to receive the aqueous matrix from the inlet;
   a first electrode and a second electrode, within the chamber, the first electrode and the second electrode each comprising metal tin;
   wherein the apparatus comprises an electrode module comprising at least the first electrode, and wherein the metal tin is to dissolve over time into the aqueous matrix as a function of applied electrical stimulus;
   a sensor to sense at least one property associated with the aqueous matrix;
   a power source coupled to the first electrode and the second electrode, the power source to provide the electrical stimulus as a function of the sensed at least one property, so as electrolyze the metal tin as to form a stannous material in dependence on the sensed at least one property and so as to thereby regulate a reaction with the target metal, wherein the power source is to cause alternating current to flow between the first electrode and the second electrode, such that each of the first electrode and the second electrode is operated as an anode for a period of time, to thereby electrolyze the metal tin to form soluble stannous material in the aqueous matrix;
   an outlet to remove the aqueous matrix from the chamber; and
   an ultrasound system to deliver ultrasound energy to the first electrode, to clean the first electrode, the ultrasound system also to deliver ultrasound energy to the second electrode, to clean the second electrode.

2. The apparatus of claim 1, wherein:
   the sensor is to measure flow rate of the aqueous matrix; and
   the power source is to control formation of the stannous material at a variable rate which is dependent on the measured flow rate of the aqueous matrix.

3. The apparatus of claim 1, wherein:
   the sensor is to measure concentration of the target metal in the aqueous matrix; and
   the power source is to control formation of the stannous material at a variable rate which is dependent on the measured concentration of the target metal.

4. The apparatus of claim 3, wherein:
   the sensor comprises a voltametric measurement system; and
   the aqueous matrix is water.

5. The apparatus of claim 3, wherein the target metal comprises hexavalent chromium.

6. The apparatus of claim 3, wherein the aqueous matrix is to flow through a conduit and wherein target metal is corrosive to the conduit.

7. The apparatus of claim 1, wherein:
   the apparatus further comprises circuitry to control the flow of current between the first electrode and the second electrode;
   the circuitry comprises at least one processor and instructions stored on non-transitory machine-readable media; and
   the instructions when executed are to cause the at least one processor to control formation of the stannous material at a rate dependent on at least one measure parameter.

8. The apparatus of claim 1, wherein:
   the electrode module comprises the first electrode and the second electrode; and
   the apparatus further comprises circuitry to detect an electrode failure condition and to generate an alert to a user to notify the user that the electrode module should be replaced.

9. The apparatus of claim 1, wherein:
   the electrode module comprises the first electrode and the second electrode; and
   the apparatus further comprises circuitry to detect an electrode failure condition and to generate an alert to a user to notify the user that the electrode module should be replaced.

10. The apparatus of claim 1, wherein:
    the apparatus further comprises a sensor to measure at least one of conductivity or pH of the aqueous matrix;

the apparatus further comprises a source of at least one solution to be selectively added to aqueous matrix, to adjust at the at least one of conductivity or pH of the aqueous matrix; and the apparatus further comprises circuitry to control addition of the at least one solution to the aqueous matrix as a function of the measured at least one of conductivity or pH of the aqueous matrix.

11. The apparatus of claim 1, wherein:
the apparatus further comprises a sensor to measure reagent generation efficiency; and
the apparatus further comprises circuitry to regulate current density at a surface of the first electrode in dependence on the measured reagent generation efficiency.

12. A method for removing a target metal from an aqueous matrix, the method comprising
receiving the aqueous matrix from an inlet, into a chamber;
using a power source to cause current to flow in the chamber between a first electrode and a second electrode, each of the first electrode and the second electrode comprising metal tin, wherein the first electrode is embodied as a part of an electrode module, and wherein the metal tin is to dissolve over time into the aqueous matrix as a function of applied electrical stimulus;
removing the aqueous matrix from the chamber via an outlet; and
delivering ultrasound energy to the first electrode from an ultrasound system, to clean each of the first electrode and the second electrode;
wherein the method further comprises, with a sensor, sensing at least one property associated with the aqueous matrix, and controlling a power source coupled to the first electrode and the second electrode, as a function of the sensed at least one property, so as to provide the electrical stimulus in a manner that electrolyzes the metal tin and forms a stannous material in dependence on the sensed at least one property, and so as to thereby regulate a reaction with the target metal; and
wherein the method further comprises causing alternating current to flow between the first electrode and the second electrode, such that each of the first electrode and the second electrode is operated as an anode for a period of time, to thereby electrolyze the metal tin to form soluble stannous material in the aqueous matrix.

13. The method of claim 12, wherein the method further comprises:
measuring flow rate of the aqueous matrix; and
controlling formation of the stannous material at a rate responsive to the measured flow rate of the aqueous matrix.

14. The method of claim 12, wherein the method further comprises:
measuring concentration of the target metal in the aqueous matrix; and
controlling formation of the stannous material at a rate responsive to the measured concentration of the target metal.

15. The method of claim 14, wherein:
the measuring of the concentration of the target metal comprises using a voltametric measurement system to measure the concentration of the target metal; and
the aqueous matrix is water.

16. The method of claim 14, wherein the target metal comprises hexavalent chromium.

17. The method of claim 14, wherein the target metal comprises an agent that is corrosive to piping.

18. The method of claim 12, wherein:
the method further comprises using control circuitry to control the flow of current between the first electrode and the second electrode;
the control circuitry comprises at least one processor and instructions stored on non-transitory machine-readable media; and
the instructions when executed are to cause the at least one processor to control formation of the stannous material in response to the at least one sensed property.

19. The method of claim 12, wherein:
the first electrode and the second electrode are both parts of the electrode module; and
the method further comprises using circuitry to automatically detect an electrode failure condition and to generate an alert to a user to notify the user that the electrode module should be replaced.

20. The method of claim 12, wherein:
the first electrode and the second electrode are both parts of an electrode module; and
the method further comprises using circuitry to automatically detect an electrode failure condition and to generate an alert to a user to notify the user that the electrode module should be replaced.

21. The method of claim 12, wherein the method further comprises:
using a sensor to measure at least one of conductivity or pH of the aqueous matrix;
providing a source of at least one solution to be selectively added to aqueous matrix, to adjust the at least one of conductivity or pH of the aqueous matrix; and
automatically controlling addition of the at least one solution to the aqueous matrix from the source as a function of the measured at least one of conductivity or pH of the aqueous matrix.

22. The method of claim 12, wherein the method further comprises:
using a sensor to automatically measure reagent generation efficiency; and
regulating current density at a surface of the first electrode in dependence on the measured reagent generation efficiency.

23. An apparatus for removing a target metal from an aqueous matrix, the apparatus comprising:
a chamber to receive an aqueous matrix from an inlet;
means for electrolyzing metal tin from each of two electrodes of an electrode module to form soluble stannous material in the aqueous matrix;
an outlet to remove the aqueous matrix from the chamber;
a sensor to sense at least one property associated with the aqueous matrix; and
means for cleaning each of the two electrodes using ultrasound;
wherein the means for electrolyzing the metal tin is to do so on a regulated basis, such that a rate of forming the soluble stannous metal is responsive to sensing of the at least one property so as to thereby regulate a reaction with the target metal; and
wherein
the means for electrolyzing the metal tin is to cause alternating current to flow between the two electrodes, such that each of the two electrodes is operated as an anode for a period of time, to thereby electrolyze the metal tin from to soluble stannous material in the aqueous matrix, and the means for cleaning is also to deliver ultrasound energy to each of the two electrodes, to clean each electrode.

24. The apparatus of claim 3, wherein the target metal comprises lead.

25. The method of claim 14, wherein the target metal comprises lead.

* * * * *